(12) United States Patent
Kim et al.

(10) Patent No.: US 7,499,721 B2
(45) Date of Patent: Mar. 3, 2009

(54) APPARATUS AND METHOD FOR TRANSMITTING AND RECEIVING FORWARD CHANNEL QUALITY INFORMATION IN A MOBILE COMMUNICATION SYSTEM

(75) Inventors: Youn-Sun Kim, Seoul (KR); Jae-Sung Jang, Kwachon-shi (KR); Ho-Kyu Choi, Songnam-shi (KR); Hwan-Joon Kwon, Seoul (KR); Dong-Hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 327 days.

(21) Appl. No.: 10/232,733

(22) Filed: Aug. 29, 2002

(65) Prior Publication Data
US 2003/0054847 A1    Mar. 20, 2003

(30) Foreign Application Priority Data

| Aug. 31, 2001 | (KR) | .......................... 10-2001-53348 |
| Oct. 25, 2001 | (KR) | .......................... 10-2001-66105 |
| Nov. 30, 2001 | (KR) | .......................... 10-2001-75534 |

(51) Int. Cl.
*H04B 17/00* (2006.01)
*H04Q 7/20* (2006.01)

(52) U.S. Cl. .................. 455/522; 455/67.11; 455/67.14; 455/69; 455/517

(58) Field of Classification Search .............. 455/67.11, 455/67.14, 68, 69, 70, 517, 522
See application file for complete search history.

(56) References Cited

U.S. PATENT DOCUMENTS 6,574,211 B2 *    6/2003    Padovani et al. ............ 370/347

2002/0110088 A1 *    8/2002    Lundby et al. .............. 370/252

FOREIGN PATENT DOCUMENTS

| DE | 198 21 519 | 11/1999 |
| EP | 0682419 | 11/1995 |
| EP | 1 089 451 A1 | 3/2000 |
| GB | 2 339 514 A | 1/2000 |
| JP | 2000-269854 | 9/2000 |
| WO | WO 95/10142 | 4/1995 |
| WO | WO 02/067461 | 8/2002 |

OTHER PUBLICATIONS

European Search Report dated Jan. 2, 2003, issued in a counterpart application, namely, Appln. No. 020194487.4.
UK Search Report dated Feb. 28, 2003, issued in a counterpart application, namely, Appln. No. GB 0220143.2.

* cited by examiner

*Primary Examiner*—Yuwen Pan
(74) *Attorney, Agent, or Firm*—The Farrell Law Firm, PC

(57) ABSTRACT

An apparatus and method for transmitting and receiving forward channel quality information between a base station and a mobile station in a CDMA mobile communication system supporting multimedia service including voice and data services. The mobile station transmits an absolute value symbol in at least one time slot selected from a plurality of time slots, and a relative value symbol in one of the remaining time slots. The absolute value symbol represents the signal strength of the forward channel in the at least one time slot corresponding to the selected time slot, and the relative value symbol represents a change in the signal strength of the forward channel between the at least one time slot corresponding to the one remaining time slot and the signal strength of the forward channel in a previous time slot.

34 Claims, 17 Drawing Sheets

| Epilot/Nt (dB) | CQI SYMBOL (a4, a3, a2, a1, a0) |
|---|---|
| NULL (Below −14.5 dB, or MS not ready) | 00000 |
| −14.5 to −13.1 dB | 00001 |
| −13.1 to −11.6 dB | 00010 |
| −11.6 to −10.2 dB | 00011 |
| −10.2 to −8.8 dB | 00100 |
| −8.8 to −7.4 dB | 00101 |
| −7.4 to −5.9 dB | 00110 |
| −5.9 to −4.5 dB | 00111 |
| −4.5 to −3.1 dB | 01000 |
| −3.1 to −1.6 dB | 01001 |
| −1.6 to −0.2 dB | 10101 |
| −2.0 to 1.2 dB | 10100 |
| 1.2 to 2.6 dB | 0110 |
| 2.6 to 4.1 dB | 01101 |
| 4.1 to 5.5 dB | 01110 |
| Above 5.5 dB | 01111 |

FIG.4

| CQI SYMBOL (a4, a3, a2, a1, a0) | CODE SEQUENCE |
|---|---|
| 00000 | 000000000000 |
| 00001 | 010101010101 |
| 00010 | 001100110011 |
| 00011 | 011001100110 |
| 00100 | 011100001111 |
| 00101 | 001001011010 |
| 00110 | 010000111100 |
| 00111 | 000101101001 |
| 01000 | 000011111111 |
| 01001 | 010110101010 |
| 10101 | 001111001100 |
| 10100 | 011010011001 |
| 0110 | 011111110000 |
| 01101 | 001010100101 |
| 01110 | 010011000011 |
| 01111 | 000110010110 |
| 10000 | 111111111111 |
| 10001 | 101010101010 |
| 10010 | 110011001100 |
| 10011 | 100110011001 |
| 10100 | 100011110000 |
| 10101 | 110110100101 |
| 10110 | 101111000011 |
| 10111 | 111010010110 |
| 11000 | 111100000000 |
| 11001 | 101001010101 |
| 11010 | 110000110011 |
| 11011 | 100101100110 |
| 11100 | 100000001111 |
| 11101 | 110101011010 |
| 11110 | 101100111100 |
| 00000 | 111001101001 |

FIG.16

APPARATUS AND METHOD FOR TRANSMITTING AND RECEIVING FORWARD CHANNEL QUALITY INFORMATION IN A MOBILE COMMUNICATION SYSTEM

PRIORITY

This application claims priority to an application entitled "Apparatus and Method for Transmitting and Receiving Forward Channel Quality Information in a Mobile Communication System" filed in the Korean Industrial Property Office on Aug. 31, 2001 and assigned Serial No. 2001-53348, to an application entitled "Apparatus and Method for Transmitting and Receiving Forward Channel Quality Information in a Mobile Communication System" filed in the Korean Industrial Property Office on Oct. 25, 2001 and assigned Serial No. 2001-66105, and to an application entitled "Apparatus and Method for Transmitting and Receiving Forward Channel Quality Information in a Mobile Communication System" filed in the Korean Industrial Property Office on Nov. 30, 2001 and assigned Serial No. 2001-75534, the contents of any of which are hereby incorporated by reference.

BACKGROUND OF THE INVENTION

1. Field of the Invention

The present invention relates generally to a mobile communication system that supports multimedia service including voice and data services, and in particular, to an apparatus and method for transmitting and receiving information indicating a forward data rate between an MS (Mobile Station) and a BS (Base Station).

2. Description of the Related Art

A typical mobile communication system, particularly CDMA (Code Division Multiple Access) mobile communication systems including synchronous CDMA (IS-2000) and asynchronous UMTS (Universal Mobile Telecommunication Service) (Wide CDMA) support an integrated service of voice, circuit data, and low-rate packet data (for example, at or below 14.4 kbps). The growing user demands for high-speed packet data service such as Internet access, however, have brought about development of corresponding mobile communication systems. CDMA 2000 1x EV-DO (Evolution Data Only) supports a 2 Mbps or above high-speed packet data service by assigning resources for a voice service to a data service, but has the shortcoming that it does not support the voice service and the data service concurrently.

To satisfy a need for a mobile communication system supporting both an existing voice service and a high-speed packet data service, 1x EV-DV (Evolution Data and Voice) has been proposed. In 1x EV-DV, a BS schedules transmission of packet data and determines transmission parameters according to forward channel quality. Specifically, the BS selects one of a plurality of MSs in communication with the BS every slot, which has the best forward channel quality, transmits packet data to the selected MS, and determines transmission parameters (e.g., data rate, code rate, and modulation order) according to the forward channel quality of the selected MS.

The carrier-to-interference ratio (C/I) of an F-CPICH (Forward Common Pilot Channel) from the BS measured in each MS is essential to determining the forward channel quality of the MS. The MS reports the C/I measurement to the BS on an R-CQICH (Reverse Channel Quality Indicator Channel). The BS schedules transmission of packet data on F-PDCHs (Forward Packet Data Channels) and determines transmission parameters according to C/Is from MSs.

FIG. 1 is a block diagram of a conventional transmitter for transmitting forward channel quality information to a BS in an MS. Referring to FIG. 1, the C/I of an F-CPICH received from a BS (a sector in the case of a sectored BS) in communication is measured, quantized, and converted to a corresponding binary 5-bit CQI (Channel Quality Indicator) symbol every 1.25-ms time slot. An encoder 110 encodes the CQI symbol at a code rate of $5/12$ (R=$5/12$) and outputs a 12-bit CQI sequence. A Walsh cover code generator 120 generates a Walsh cover code of length 8, $W_i^8$ (i=0, ... 7) according to a BSI (Best Sector Indicator) indicating a BS having the best forward channel quality among BSs that the MS can sense.

A Walsh cover 130 generates a 96-bit Walsh covered symbol by multiplying the code sequence by the Walsh cover code $W_i^8$. A signal mapper 140 maps the 96-bit symbol to a symbol with +1s and −1s. A Walsh spreader 150 spreads the output of the signal mapper 140 with a Walsh code assigned to a CQICH, $W_{12}^{16}$ prior to transmission.

FIG. 2 is a timing diagram for transmission and reception of forward channel quality information in the BS and the MS. Referring to FIG. 2, the MS transmits to the BS a CQI symbol indicating the C/I of the F-CPICH from the BS in each slot of an R-CQICH. The BS receives the CQI symbol after some propagation delay and uses it for PDCH scheduling and parameter determination. The propagation delay is time required for the CQI symbol to go through the air. In FIG. 2, a CQI symbol received in an nth slot of the R-CQICH is applied to an (n+1)th slot of an F-PDCH after some processing delay. The processing delay refers to time required to calculate the C/I of the F-CPICH from the CQI symbol, schedule packet data transmission, and determine transmission parameters.

In the above conventional method of transmitting and receiving forward quality information, the reverse traffic capacity of the BS is remarkably reduced because a plurality of MSs transmit CQI symbols in each slot to the BS. Moreover, R-CQICHs from the MSs interfere with one another, resulting in the increase of interference across the overall system.

SUMMARY OF THE INVENTION

It is, therefore, an object of the present invention to provide an apparatus and method for transmitting forward channel quality information, minimizing reverse overhead in a mobile communication system supporting voice and packet data services.

It is another object of the present invention to provide an apparatus and method for transmitting forward channel quality information, minimizing reverse transmission power in a mobile communication system supporting voice and packet data services.

It is a further object of the present invention to provide an apparatus and method for transmitting forward channel quality information, minimizing co-channel interference on a reverse link in a mobile communication system supporting voice and packet data services.

It is still another object of the present invention to provide an apparatus and method for transmitting forward channel quality information separately as an absolute value and a relative value in a mobile communication system supporting voice and packet data services.

It is yet another object of the present invention to provide an apparatus and method for receiving forward channel quality information to schedule packet data transmission and determine transmission parameters in a mobile communication system supporting voice and packet data services.

To achieve the above and other objects, there is provided an apparatus and method for transmitting and receiving forward channel quality information between a base station and a mobile station in a CDMA mobile communication system supporting multimedia service including voice and data services.

According to one aspect of the present invention, the MS measures the signal strengths of the forward channel in a plurality of time slots, and transmits an absolute value symbol in at least one time slot selected from the plurality of time slots and a relative value symbol in at least one time slot of the remaining time slots. Here, the absolute value symbol represents the signal strength of the forward channel in at least one time slot corresponding to the selected time slot, and the relative value symbol represents a change in the signal strength of the forward channel in at least one time slot corresponding to the one remaining time slot against the signal strength of the forward channel measured in a previous time slot.

According to another aspect of the present invention, the MS measures the signal strengths of the forward channel in a plurality of time slots, transmits an absolute value symbol in at least one time slot selected from the plurality of time slots, and stores the signal strength measurement. Here, the absolute value symbol represents the signal strength of the forward channel measured in at least one time slot corresponding to the selected time slot. The MS transmits a relative value symbol in at least one time slot of the remaining time slots, updates the signal strength of a previous time slot according to what the relative value symbol represents, and stores the updated signal strength. The relative value symbol represents a change in the signal strength of the forward channel in at least one time slot corresponding to the one remaining time slot against the signal strength of the forward channel stored in the previous time slot.

According to a further aspect of the present invention, the BS receives an absolute value symbol in at least one time slot selected from a plurality of time slots, calculates the signal strength of the selected time slot according to the absolute value symbol, receives a relative value symbol in at least one of the remaining time slots, updates the signal strength of a previous time slot according to what the relative value symbol represents, and calculates the signal strength of the one remaining time slot.

According to still another aspect of the present invention, a symbol generator in the MS generates an absolute value symbol in at least one time slot selected from a plurality of time slots and generates a relative value symbol in at least one of the remaining time slots. Here, the absolute value symbol represents the signal strength of the forward channel in at least one time slot corresponding to the selected time slot, and the relative value symbol represents a change in the signal strength of the forward channel in at least one time slot corresponding to the one remaining time slot against the signal strength of the forward channel in a previous time slot. An encoding unit encodes the absolute value symbol and the relative value symbol.

According to yet another aspect of the present invention, a receiver in the BS receives an absolute value symbol in at least one time slot selected from a plurality of time slots, and a relative value symbol in at least one of the remaining time slots. A symbol calculator calculates the signal strength of the selected time slot according to the absolute value symbol, updates the signal strength of a previous time slot according to what the relative value symbol represents, and calculates the signal strength of the one remaining time slot.

BRIEF DESCRIPTION OF THE DRAWINGS

The above and other objects, features and advantages of the present invention will become more apparent from the following detailed description when taken in conjunction with the accompanying drawings in which:

FIG. 4 illustrates a mapping table in which C/I levels of an F-CPICH are mapped to absolute value symbols according to the embodiment of the present invention;

FIG. 16 illustrates a mapping table listing CQI symbols being encoder input mapped to code sequences being encoder output according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In the present invention, an MS transmits to a BS the absolute value of the signal strength of a forward channel measured in the current time slot, as measured in the MS, in a predetermined time slot, and its relative value in the other time slots. The relative value indicates an increase, no change, or a decrease in the forward channel signal strength as a result from a comparison between signal strengths in the current time slot and in the previous time slot. Therefore, the relative value can be transmitted with less information volume and lower power.

While the following description is made in the context of IS-2000 1x EV-DV, the present invention is also applicable to other mobile communication systems operating with similar technological backgrounds and channel structures with modifications made within the scope and spirit of the present invention, which is obviously understood by those skilled in the art.

Figure 1:
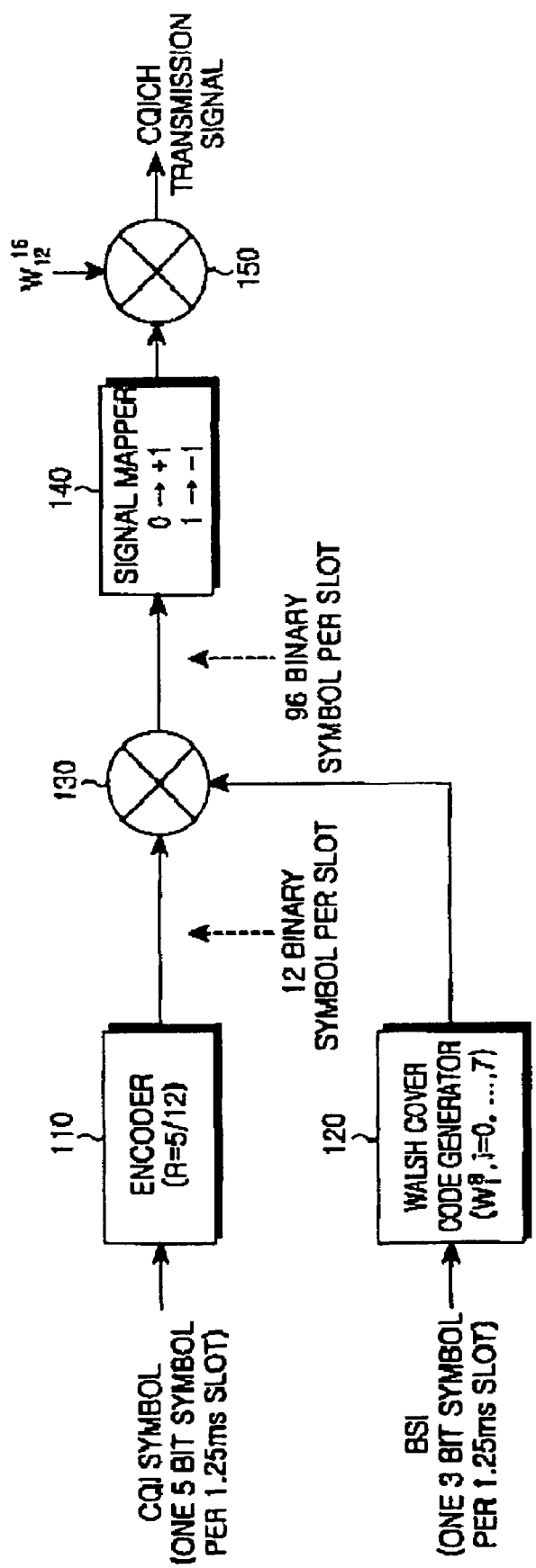
FIG. 1 is a block diagram of a conventional transmitter for transmitting forward channel quality information to a BS in an MS.
Figure 2:
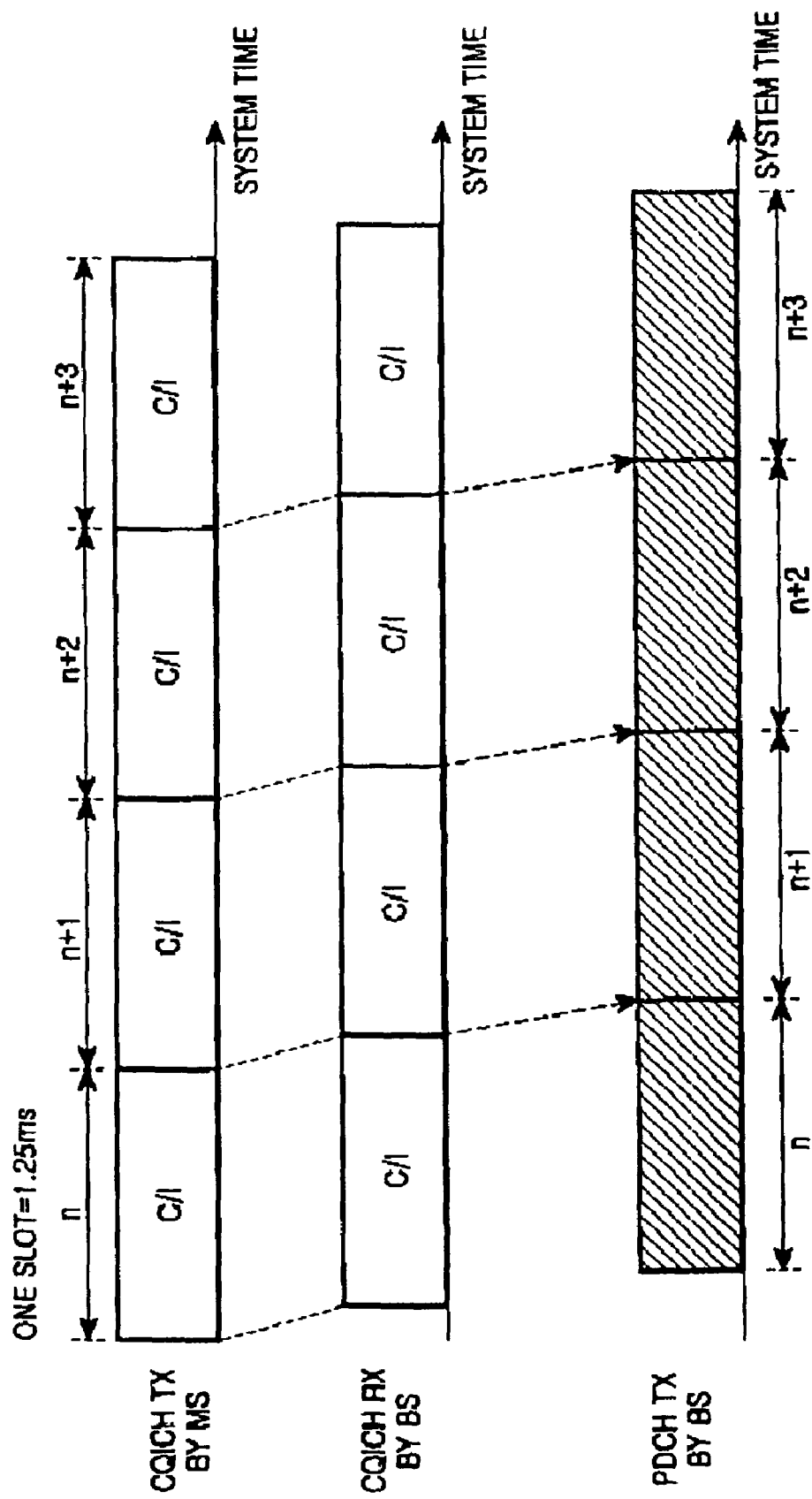
FIG. 2 is a timing diagram for transmission and reception of forward channel quality information in the conventional BS and MS.
Figure 3:
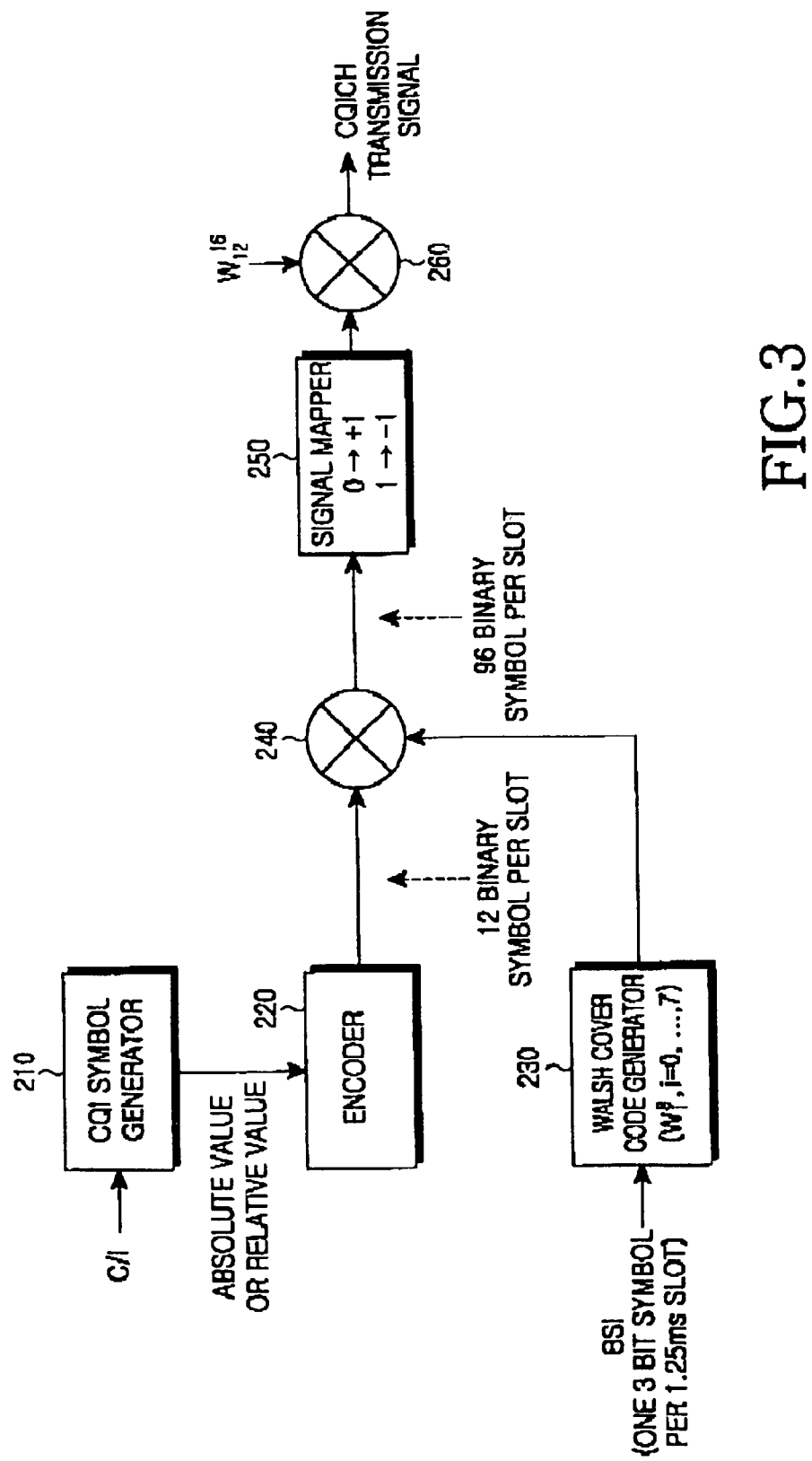
FIG. 3 is a block diagram of a transmitter for transmitting forward channel quality information to a BS in an MS according to an embodiment of the present invention.

FIG. 3 is a block diagram of a transmitter for transmitting forward channel quality information to a BS in an MS according to an embodiment of the present invention. The MS transmits to the BS information about the quality of an F-CPICH measured in a predetermined slot on a corresponding slot of an R-CQICH.

Referring to FIG. 3, the C/I of an F-CPICH received from the BS currently communicating with the MS, which is measured every 1.25-ms time slot, is fed to a CQI symbol generator 210. The CQI symbol generator 210 converts the C/I to a CQI symbol representing an absolute C/I value (hereinafter, referred to as an absolute value symbol) or a CQI symbol representing a relative C/I value (i.e., increase, equal, or decrease) (hereinafter, referred to as a relative value symbol). According to a rule preset between the BS and the MS during a call setup, the CQI symbol generator 210 generates an absolute value symbol in a predetermined slot and relative value symbols in the other slots. The absolute symbol value corresponds to the level of the C/I. FIG. 4 illustrates a mapping table in which the C/I levels of the F-CPICH are mapped to absolute value symbols.

Referring to the mapping table illustrated in FIG. 4, the absolute value symbols represent 16 C/I levels with a 1.4 to 1.5 dB scale per level. While the MSB (Most Significant Bit) of each CQI symbol is reserved in FIG. 4, up to $2^5$ C/I levels can be expressed with the 5-bit CQI symbols. A relative value symbol represents a change (increase, equal, or decrease) in the C/I of the current slot against the C/I of the previous slot.

Therefore, the CQI symbol generator 210 stores the mapping table illustrated in FIG. 4, searches for an absolute value symbol corresponding to a C/I measured in each slot in the mapping table, and outputs it. The CQI symbol generator 210 also stores the C/I measurement, compares the C/I of the current slot with the C/I of the previous slot, and generates a relative value symbol representing a change in the C/I.

An encoder 220 encodes the CQI symbol and outputs a 12-bit code sequence. A Walsh cover code generator 230 generates a Walsh cover code of length 8, $W_i^8$ (i=0, ..., 7) according to a BSI indicating a BS having the best forward channel quality among BSs that the MS can sense.

A Walsh cover 240 generates a 96-bit Walsh covered symbol by multiplying the code sequence by the Walsh cover code $W_i^8$. A signal mapper 250 maps the 96-bit symbol to a symbol with +1s and −1s. A Walsh spreader 260 spreads the output of the signal mapper 250 with a Walsh code assigned to a CQICH, $W_{12}^{16}$. The output of the Walsh spreader 260 is amplified to an appropriate transmission power level in a power amplifier (not shown) prior to transmission.

As shown above, the absolute value symbol occupies more information volume than the relative value symbol because it represents the C/I of the F-CPICH as it is. Hence it is preferable to transmit the absolute value symbol with higher transmission power (e.g., twice higher) than the relative value symbol, so that the reliability of the absolute value symbol is ensured and the transmission power of the MS is saved during a relative value symbol transmission period.

Figure 5:
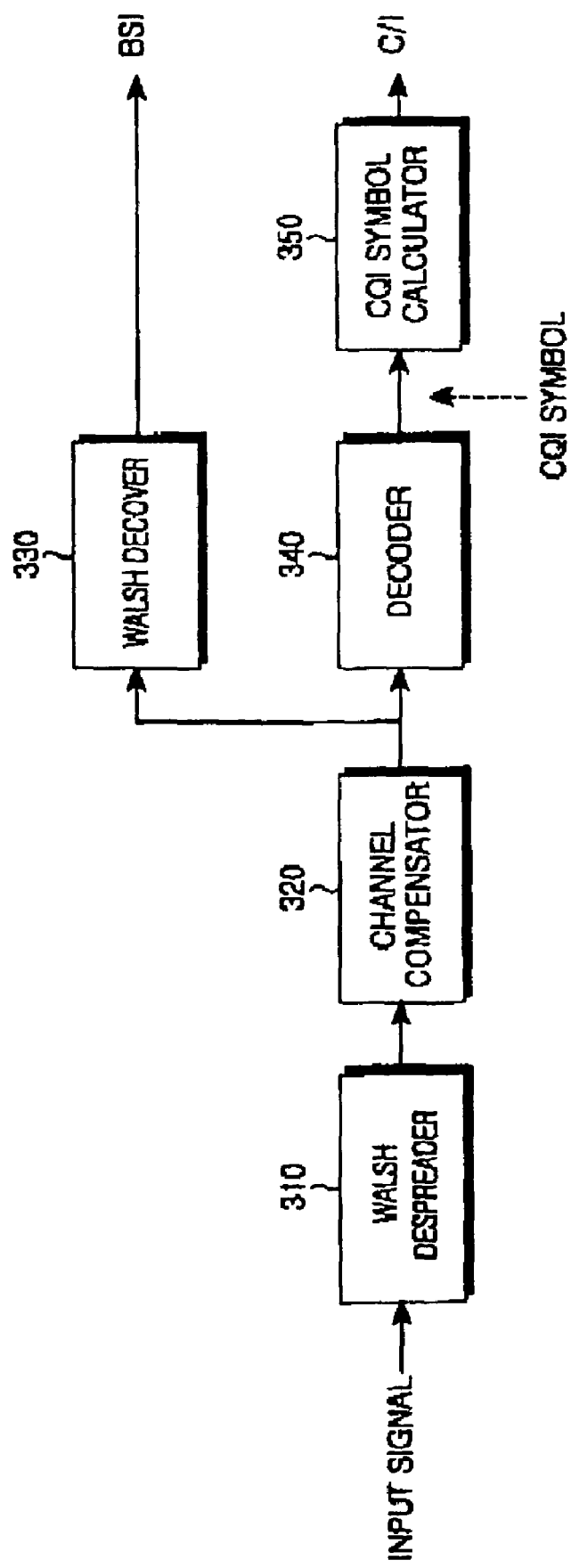
FIG. 5 is a block diagram of a receiver for receiving forward channel quality information from the MS in the BS according to the embodiment of the present invention.

FIG. 5 is a block diagram of a receiver for receiving forward channel quality information from the MS in the BS according to the embodiment of the present invention. The BS applies quality information received on the R-CQICH in a predetermined time slot to a corresponding time slot of an F-PDCH.

Referring to FIG. 5, a Walsh despreader 310 despreads a signal received from the MS in each time slot with a Walsh code assigned to the R-CQICH, $W_{12}^{16}$. A channel compensator 320 channel-compensates the spread signal. A Walsh decover 330 recovers a BSI by Walsh-decovering the channel-compensated signal. A decoder 340 decodes the channel-compensated signal at a corresponding code rate, thereby recovering a CQI symbol. A CQI symbol calculator 350 calculates the C/I of the F-CPICH using the recovered CQI symbol.

The C/I calculation will be described below in more detail.

Every time a CQI symbol is output from the decoder 340, the CQI symbol calculator 350 determines whether the CQI symbol is an absolute value symbol or a relative value symbol. According to a rule preset between the MS and the BS during a call setup, the CQI symbol calculator 350 determines a CQI symbol in a predetermined slot to be an absolute value symbol and CQI symbols in the other slots to be relative value symbols. In the case of an absolute value symbol, the CQI symbol calculator 350 calculates the C/I of the F-CPICH using the absolute value symbol. To do so, the CQI symbol calculator 350 has the mapping table illustrated in FIG. 4 and searches for a C/I corresponding to the absolute value symbol. In the case of a relative value symbol, the CQI symbol calculator 350 calculates the C/I of the F-CPICH in the current slot using the relative value symbol and the stored C/I of the F-CPICH in the previous slot.

Figure 6:
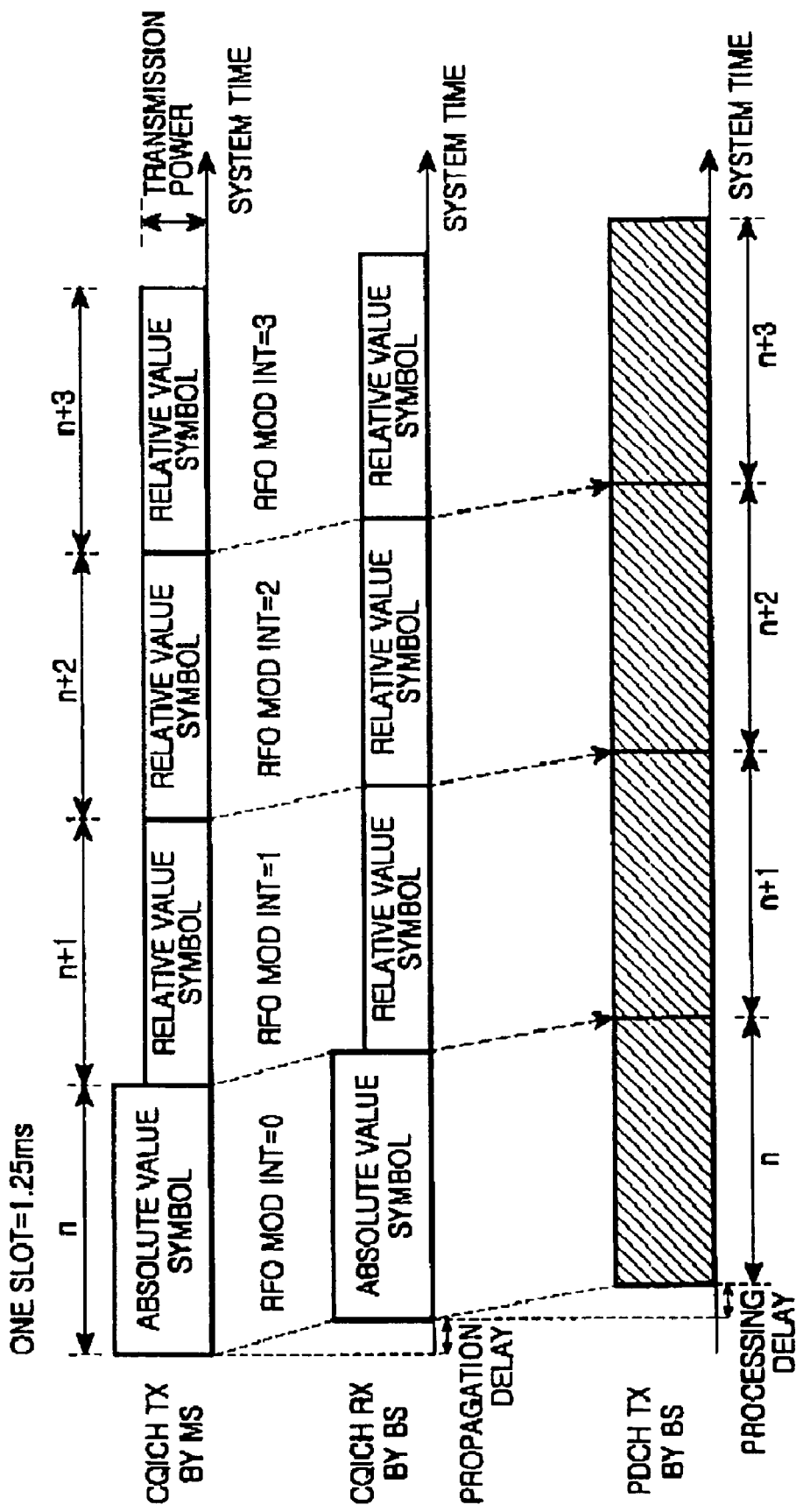
FIG. 6 is a timing diagram for transmission and reception of forward channel quality information between the BS and the MS when an absolute value symbol is transmitted every four slots according to the embodiment of the present invention.

FIG. 6 is a timing diagram for transmission and reception of forward channel quality information between the BS and the MS when an absolute value symbol is transmitted every four slots according to the embodiment of the present invention.

Referring to FIG. 6, the MS transmits to the BS a CQI symbol representing the C/I of the F-CPICH on the R-CQICH in each slot. Upon receipt the CQI symbol after some propagation delay, the BS uses the CQI symbol for scheduling PDCHs and determining transmission parameters after some processing delay. The propagation delay is time required for the CQI symbol to go through the air and the processing delay is time required to calculate a C/I using the CQI symbol, perform scheduling, and determine transmission parameters.

More specifically, the MS transmits an absolute value symbol in an nth slot and relative value symbols in (n+1)th, (n+2)th, and (n+3)th slots on the R-CQICH. The absolute value symbol is transmitted at a power level twice that of each relative value symbol. The BS calculates the C/I of the F-CPICH using the absolute value symbol and determines an MS to which the (n+1)th slot is to be assigned and transmission parameters (e.g., data rate, code rate, and modulation order) for transmission in the (n+1)th slot. The C/I of the nth slot is updated with the relative value symbol received in the (n+1)th slot and applied to the (n+2)th slot of an F-PDCH.

For example, when the absolute value symbol in the nth slot is '00100' in the mapping table of FIG. 4, the BS determines the C/I of the F-CPICH in the nth slot is −10.2 dB. If the relative value symbol in the (n+1)th slot represents a C/I increase, the BS determines that the C/I of the F-CPICH in the (n+1)th slot is −8.8 dB.

Which slots of the R-CQICH to assign to absolute value symbols can be determined in many ways. One of them is to use an RFO (Reverse Frame Offset) unique to each MS. Then the slots for absolute value symbols are determined by $$(T-N-RFO) \bmod INT \qquad (1)$$

where T is system time counted in the unit of slots, INT is a transmission interval at which an absolute value symbol is transmitted, N is a parameter that determines a slot for transmitting the absolute value symbol in the transmission interval INT, RFO is an Reverse Frame Offset, an unique value to each MS, and MOD represents modulo operation. Eq. (1) is valid even if the RFO is replaced with other parameters unique to the MS.

In a synchronous mobile communication system, Eq. (1) produces the same result in both the MS and the BS since the MS is synchronized to the system timing of the BS. Thus, the MS transmits an absolute value symbol in a slot when a solution to Eq. (1) is equal to 0, and relative value symbols in the other slots. The BS also detects the slot for the absolute value symbol using Eq. (1).

N is set such that slots in which a plurality of MSs in communication with the BS transmit absolute value symbols alternately during the transmission interval INT. The reason for distributing the slots for transmitting absolute value symbols is to reduce co-symbol interference caused by transmission of the absolute value symbols with relatively high transmission power.

Figure 7:
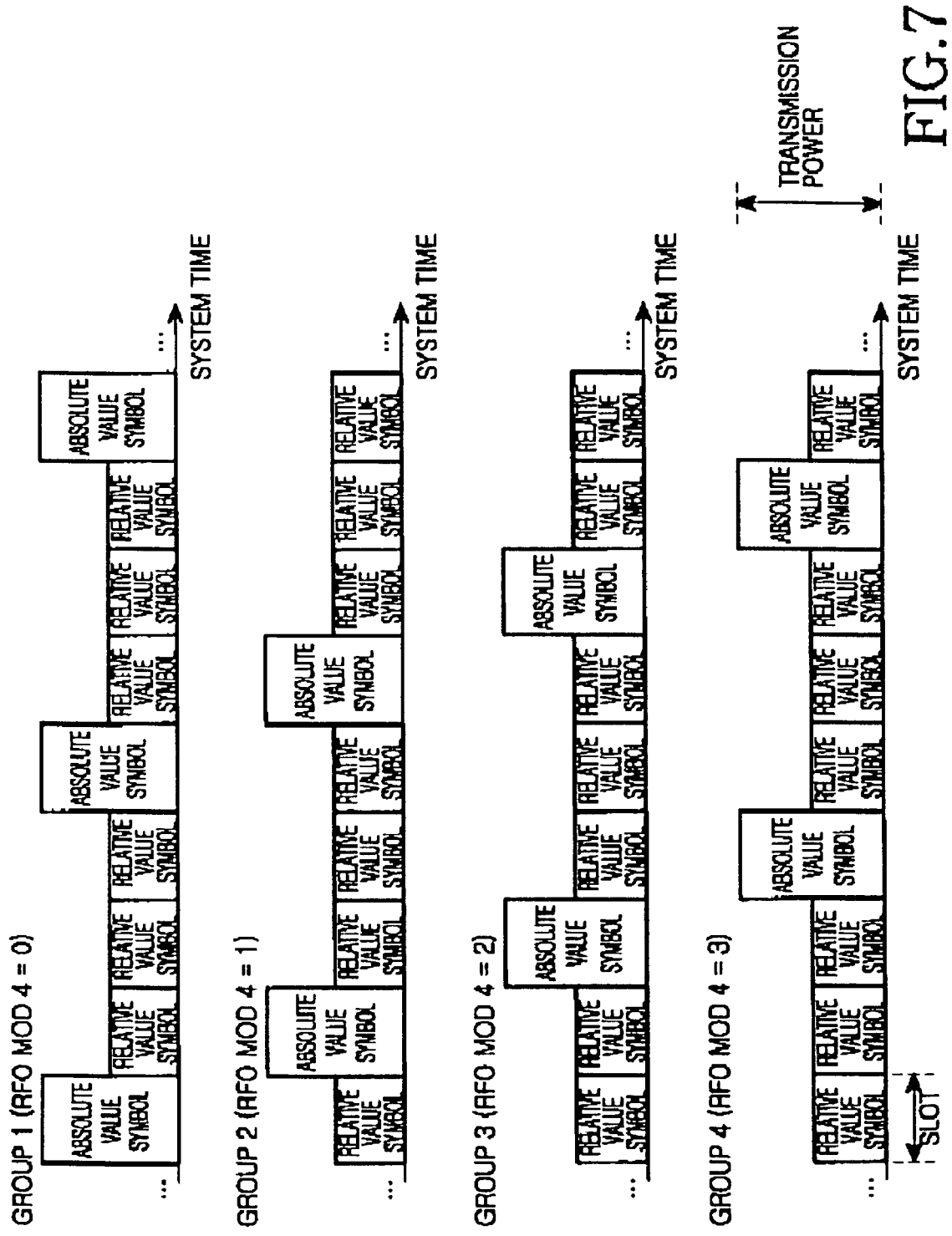
FIG. 7 is a timing diagram for alternating transmission of absolute value symbols from MSs to the BS according to the embodiment of the present invention.

FIG. 7 is a timing diagram for alternating transmission of absolute value symbols from MSs to the BS according to the embodiment of the present invention. If the transmission interval INT of absolute value symbols is 4 slots, RFO mod 4(=N) is one of 0, 1, 2 and 3. The system time is not considered here since it is identical to the MSs. Then, the slots for transmitting absolute value symbols from the MSs are distributed in time according to the parameter N.

Referring to FIG. 7, group 1 includes MSs with N=0, group 2 includes MSs with N=1, group 3 includes MSs with N=2, and group 4 includes MSs with N=3. N is determined by negotiations between the BS and a corresponding MS during a call setup.

Figure 8:
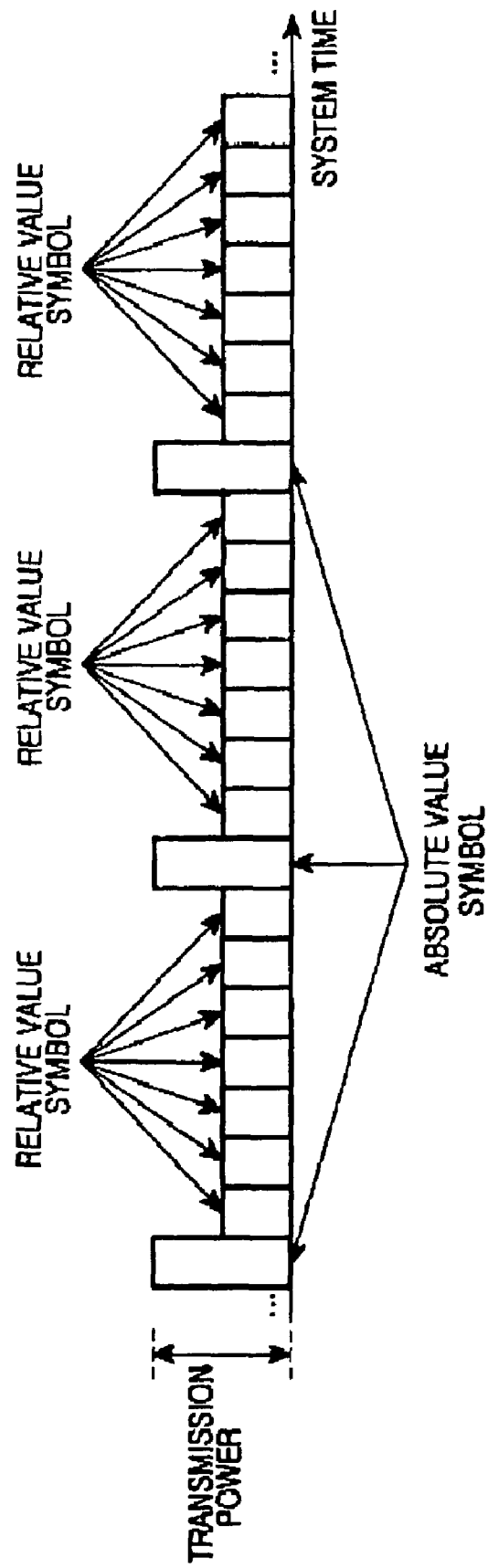
FIG. 8 illustrates CQI symbol transmission when an absolute value symbol is transmitted at a transmission interval of 8 according to the embodiment of the present invention.

FIG. 8 illustrates CQI symbol transmission when an absolute value symbol is transmitted at a transmission interval of 8 according to the embodiment of the present invention. As illustrated in FIG. 8, an absolute value symbol is transmitted every 8th time slot and relative value symbols are transmitted in the other time slots.

While it has been described that the MS transmits a CQI symbol in each slot on the R-CQICH, the present invention is also applicable in the case where the CQI symbol is transmitted every two, four, or more slots. For example, if a CQI symbol is transmitted every two slots and transmission interval is 16 slots, an absolute value symbol is transmitted in one of the 16 slots and relative value symbols in 7 slots.

In accordance with the present invention, the MS transmits an absolute value symbol not in each slot but in a predetermined slot. Hence if the absolute value symbol is lost, the BS cannot know an accurate C/I of the F-CPICH until the next absolute value symbol is received. This implies that the absolute value symbol needs higher transmission reliability than the relative value symbol. However, simply transmitting the absolute value symbol with higher transmission power than the relative value symbol may not satisfy the requirement. Therefore, absolute value symbols are transmitted in at least two successive slots in another embodiment of the present invention.

Figure 9:
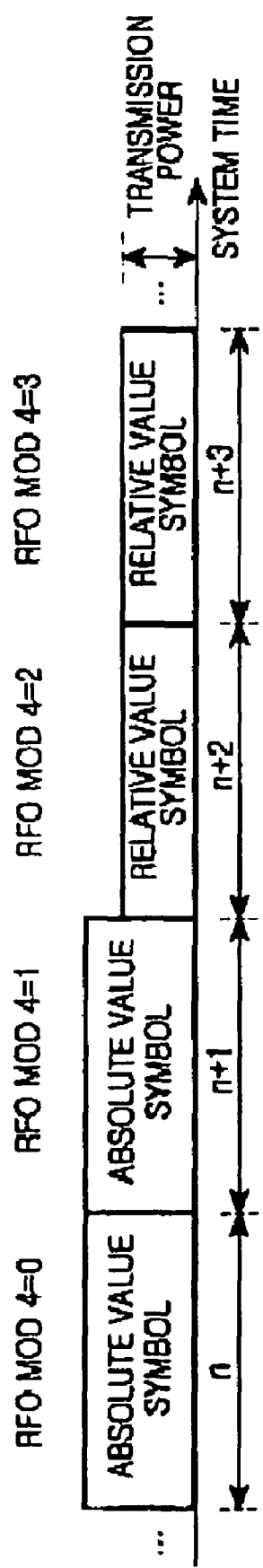
FIG. 9 illustrates transmission of successive absolute value symbols according to another embodiment of the present invention.

FIG. 9 illustrates repeated transmission of an absolute value symbol according to another embodiment of the present invention. The MS transmits two absolute value symbols during one transmission interval.

Referring to FIG. 9, the MS transmits an absolute value symbol in an nth slot and an (n+1)th slot on the R-CQICH, and an relative value symbol in an (n+2)th slot and an (n+3)th slot. The absolute value symbol in the nth slot represents the C/I of the F-CPICH in an nth slot and the absolute value symbol in the (n+1)th slot represents the C/I of the F-CPICH in an (n+1)th slot. The absolute value symbols are transmitted at a power level twice that of the relative value symbols.

As stated before, since slot positions for transmitting absolute value symbols are determined by the parameter N, each MS is assigned two Ns. For example, the MS transmits absolute value symbols in slots corresponding to N=0 and N=1, and relative value symbols in the other slots. The BS calculates the C/I of the F-CPICH using the absolute value symbols received in the nth and (n+1)th slots. Even if either of the absolute value symbols is lost, the BS can calculate the C/I of the F-CPICH accurately. The transmission of two absolute value symbols in two successive slots ensures more reliable transmission of the absolute value symbols.

Figure 10:
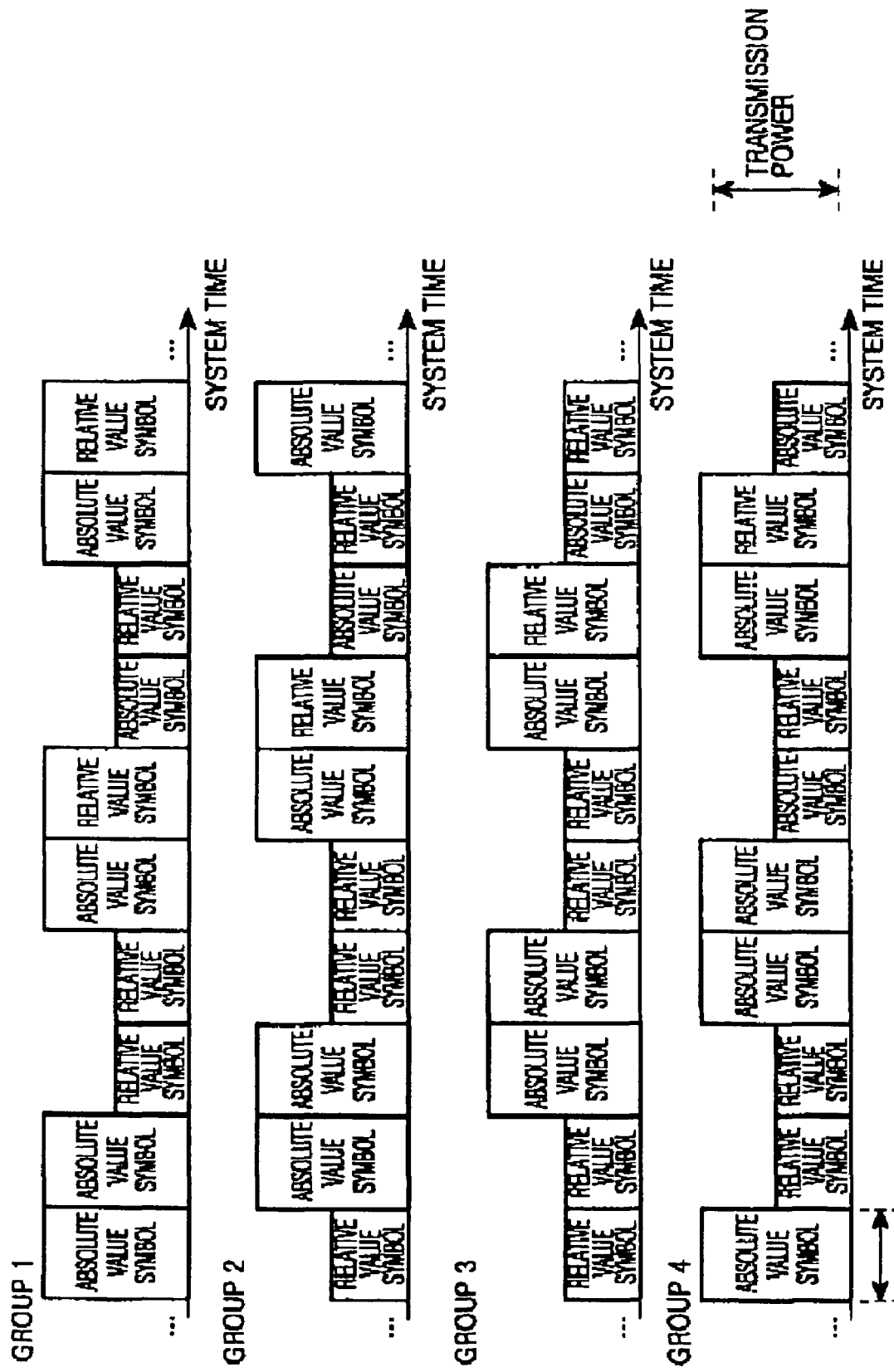
FIG. 10 is a timing diagram for alternating transmission of absolute value symbols from MSs to the BS when two absolute value symbols are transmitted in two successive slots from each MS according to the second embodiment of the present invention.

FIG. 10 is a timing diagram for alternating transmission of absolute value symbols from MSs to the BS when two absolute value symbols are transmitted in two successive slots from each MS according to the second embodiment of the present invention. As illustrated, the slots for transmitting absolute value symbols are distributed over time.

Generation and Interpretation of CQI symbols

Figure 11:
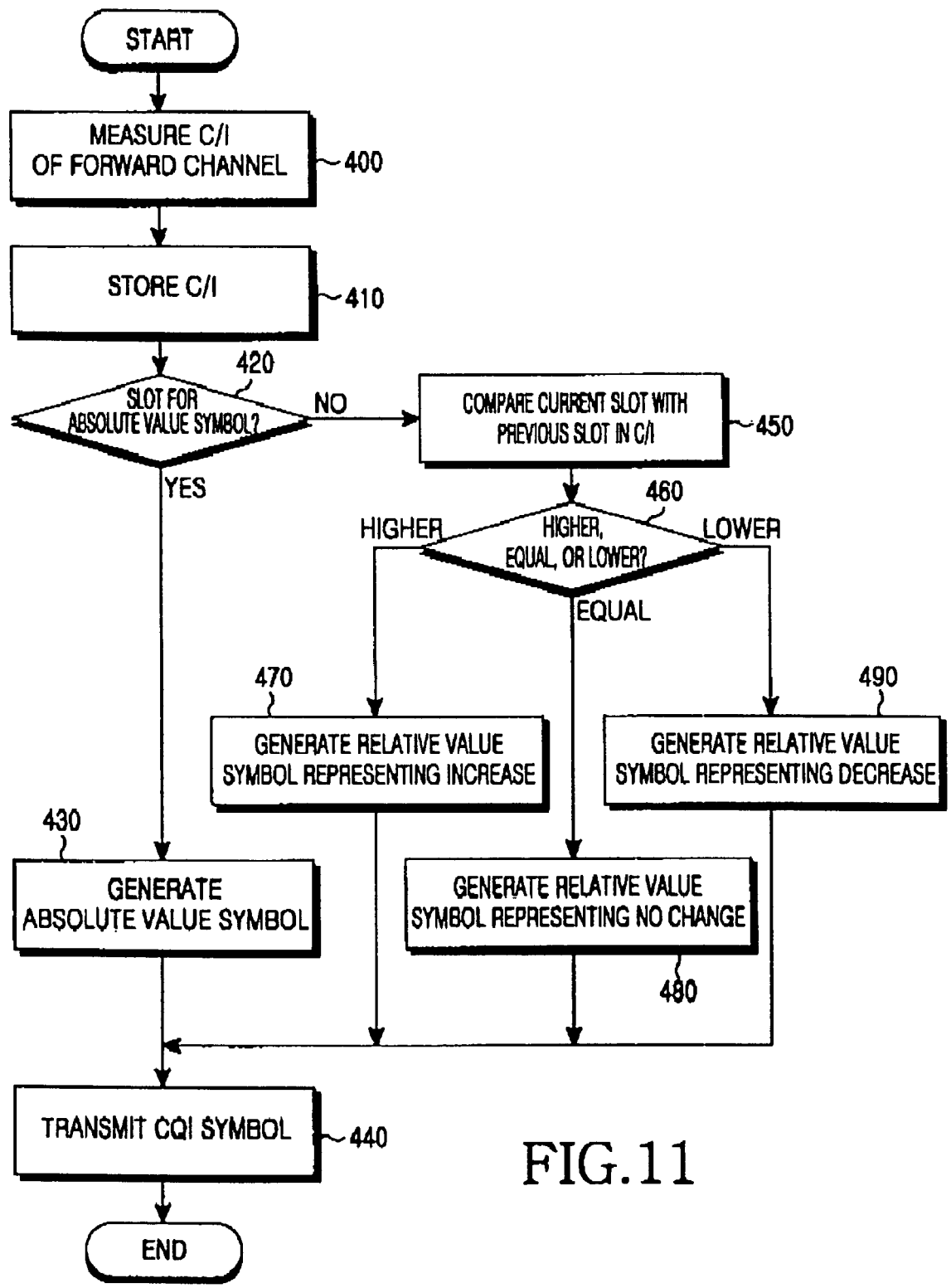
FIG. 11 is a flowchart illustrating an embodiment of a procedure for transmitting forward channel quality information to the BS in the MS according to the present invention.

FIG. 11 is a flowchart illustrating an embodiment of a procedure for transmitting forward channel quality information to the BS in the MS according to the present invention. The following procedure occurs in each time slot by the CQI symbol generator 210 of FIG. 3 in the MS.

Referring to FIG. 11, the MS measures the signal strength, that is, C/I of the F-CPICH in the current slot in step 400. The C/I measurement is stored for comparison with the C/I of the F-CPICH in the next slot in step 410. The MS determines whether to transmit the C/I as an absolute value symbol or a relative value symbol by Eq. (1) in step 420. If the result of calculating Eq. (1) according to the current system time is 0, the MS determines to transmit the absolute value of the C/I and otherwise, it determines to transmit the relative value of the C/I.

If the current time slot is for an absolute value symbol, the MS generates an absolute value symbol representing the C/I referring to the mapping table in step 430.

If the current time slot is for a relative value symbol, the MS compares the C/I of the F-CPICH in the previous slot with the C/I of the F-CPICH in the current slot in step 450. Referring to the mapping table, the MS determine whether the C/I of the F-CPICH in the current slot is higher than, equal to, or lower than the C/I of the F-CPICH in the previous slot in step 460.

If the C/I of the F-CPICH in the current slot is higher than the C/I of the F-CPICH in the previous slot, the MS generates a relative value symbol representing a C/I increase in step 470. For example, the relative value symbol representing a C/I increase is set to '11'. If the C/I of the F-CPICH in the current slot is equal to the C/I of the F-CPICH in the previous slot, the MS generates a relative value symbol representing no change in the C/I in step 480. For example, the relative value symbol representing no change is set to '00'. If the C/I of the F-CPICH in the current slot is lower than the C/I of the F-CPICH in the previous slot, the MS generates a relative value symbol representing a C/I decrease in step 490. For example, the relative value symbol representing a C/I decrease is set to '01' or '10'. The number of bits and contents of the relative value symbol is determined depending on the type of an encoder to which the relative value symbol is input, which will be described later.

A CQI symbol generated in one of steps 430, 470, 480, or 490 is transmitted on the R-CQICH in step 440. That is, the CQI symbol is fed to the encoder 220 of FIG. 3 and transmitted to the BS in the afore-described procedure.

Figure 12:
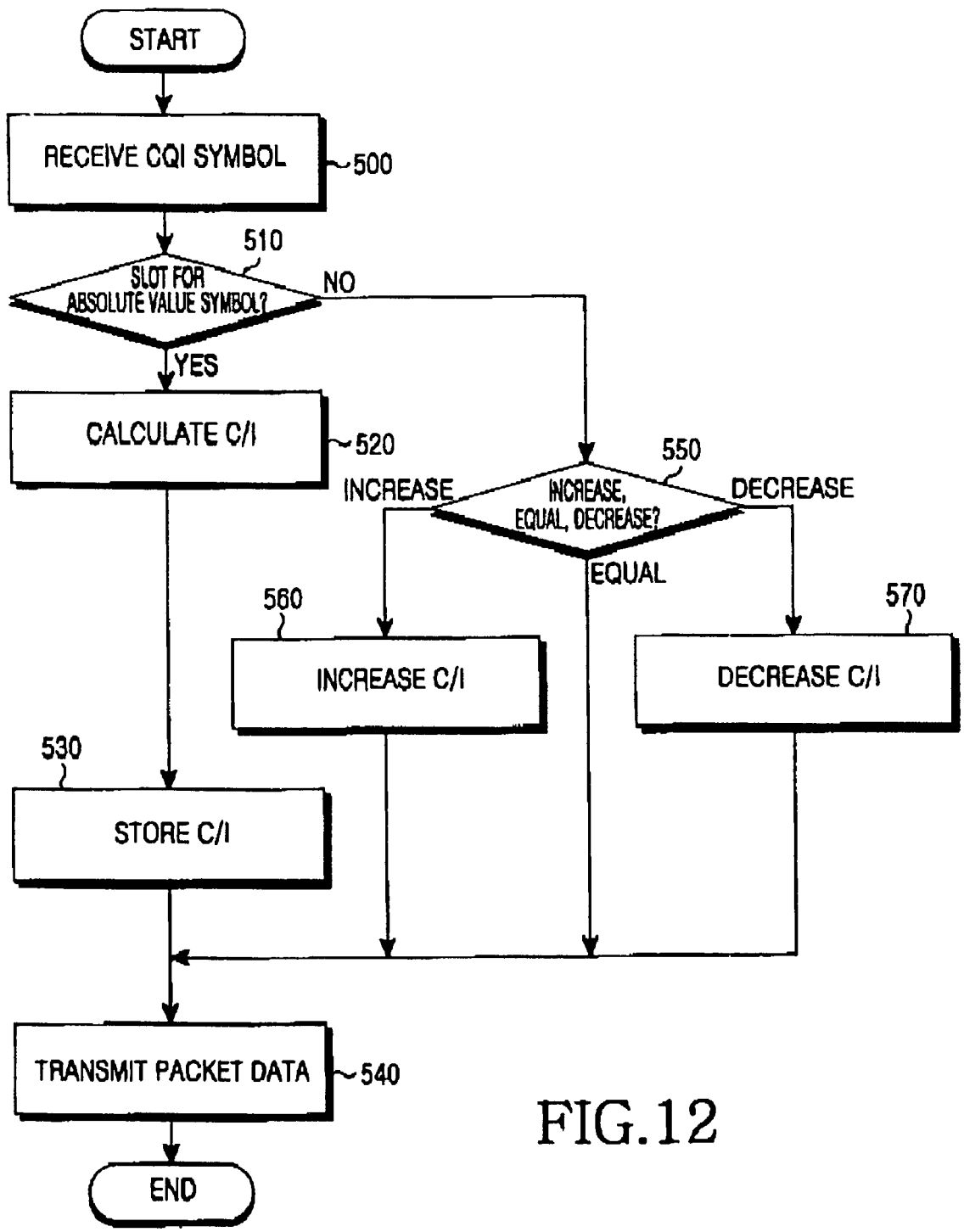
FIG. 12 is a flowchart illustrating an embodiment of a procedure for receiving forward channel quality information from the MS in the BS according to the present invention.

FIG. 12 is a flowchart illustrating an embodiment of a procedure for receiving forward channel quality information from the MS in the BS according to the present invention. The procedure occurs in each time slot by the CQI symbol calculator 350 of FIG. 5 in the BS.

Referring to FIG. 12, upon receipt of a CQI symbol in the current time slot in step 500, the BS determines whether the CQI symbol is an absolute value symbol or a relative value symbol in step 510. If the current slot in which the CQI symbol has been received is for an absolute value symbol, the received CQI symbol is an absolute value symbol. If the current slot is for a relative value symbol, the received CQI symbol is a relative value symbol. The determination is made in the same rule as applied to the MS. That is, if the result from calculating Eq. (1) according to the current system time is 0, the BS determines that an absolute value symbol has been received. If the result is not 0, the BS determines that a relative value symbol has been received. To make the determination, the BS stores Eq. (1) therein.

In the case of an absolute value symbol, the BS calculates the C/I of the F-CPICH referring to the mapping table in step 520 and stores the C/I for use in reception of a relative value symbol and packet data transmission in step 530.

In the case of a relative value symbol, the BS determines what the relative value symbol represents in step 550. If the relative value symbol represents a C/I increase, the BS updates a previously stored C/I to increase by one level referring to the mapping table in step 560. If the relative value symbol represents a C/I decrease, the BS updates the previously stored C/I to decrease by one level referring to the mapping table in step 570. If the relative value symbol represents no change in C/I, the BS maintains the previously stored C/I.

After determining the C/I of the F-CPICH, the BS transmits packet data according to the C/I of the F-CPICH in step 540. That is, the BS schedules packet data transmission and determines transmission parameters based on the C/I of the F-CPICH.

For example, when an absolute value symbol '00101' is received in the previous slot and a relative value symbol representing a C/I increase is received in the current slot, the BS determines the C/I of the current slot to be −7.4 dB corresponding to '00110' in the mapping table of FIG. 4. When the absolute value symbol '00101' is received in the previous slot and a relative value symbol representing a C/I decrease is received in the current slot, the BS determines the C/I of the current slot to be −10.2 dB corresponding to '00100' in the mapping table of FIG. 4. When the absolute value symbol '00101' is received in the previous slot and a relative value symbol representing no change in C/I is received in the current slot, the BS determines the C/I of the current slot to be −8.8 dB corresponding to '00101' in the mapping table of FIG. 4.

A C/I calculated according to an absolute value symbol is updated every time a relative value symbol is received, and replaced with a new calculated C/I when the next absolute value symbol is received.

Since a relative value symbol represents three C/I states (increase, no change, and decrease) as a result of comparing the previous slot C/I with the current slot C/I in the procedures illustrated in FIGS. 11 and 12, the relative value symbol occupies at least two bits. If the relative value symbol represents just two C/I states (increase and decrease), it can be produced with one bit. In this case, power is saved. While a relative value symbol represents a C/I change on a level basis according to the pre-stored mapping table in FIGS. 11 and 12, the C/I change may reflect a C/I comparison in a predetermined unit, for example, on a dB basis to more accurately express a C/I with a relative value symbol.

Figure 13:
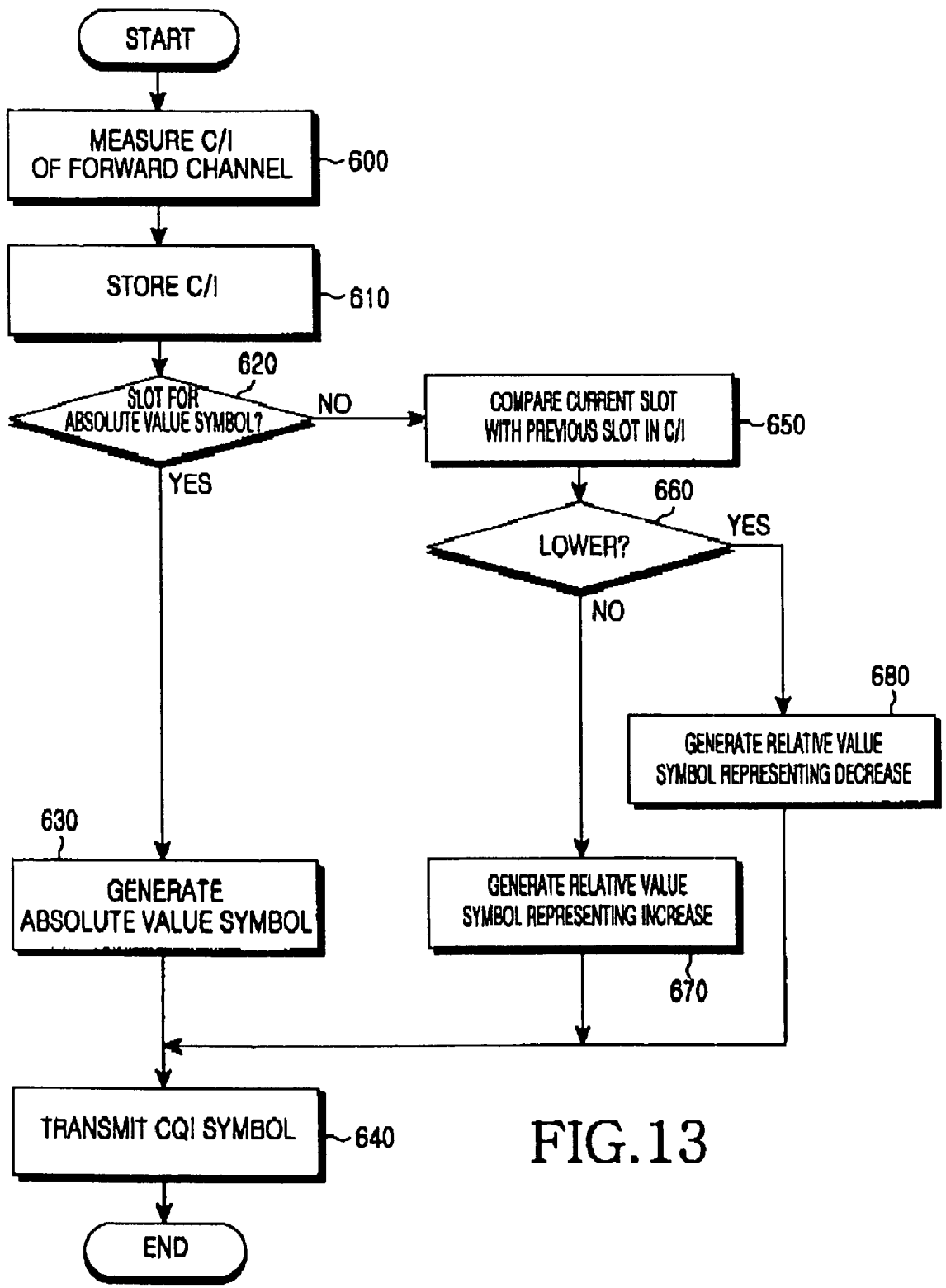
FIG. 13 is a flowchart illustrating another embodiment of the procedure for transmitting forward channel quality information to the BS in the MS according to the present invention.

FIG. 13 is a flowchart illustrating another embodiment of the procedure for transmitting forward channel quality information to the BS in the MS according to the present invention. The following procedure occurs in each time slot by the CQI symbol generator 210 of FIG. 3 in the MS.

Referring to FIG. 13, the MS measures the signal strength, that is, C/I of the F-CPICH in the current slot in step 600. The C/I measurement is stored for comparison with the C/I of the F-CPICH in the next slot in step 610. The MS determines whether to transmit the C/I as an absolute value or a relative value by Eq. (1) in step 620. If the result of calculating Eq. (1) according to the current system time is 0, the MS determines to transmit the absolute value of the C/I and otherwise, it determines to transmit the relative value of the C/I.

If the current time slot is for an absolute value symbol, the MS generates an absolute value symbol representing the C/I referring to the mapping table in step 630.

If the current time slot is for a relative value symbol, the MS compares the C/I of the F-CPICH in the previous slot with the C/I of the F-CPICH in the current slot in step 650. The MS determine whether the C/I of the F-CPICH in the current slot is lower than the C/I of the F-CPICH in the previous slot in step 660.

If the C/I of the F-CPICH in the current slot is higher than or equal to the C/I of the F-CPICH in the previous slot, the MS generates a relative value symbol representing a C/I increase in step 670. For example, the relative value symbol is set to '1'. If the C/I of the F-CPICH in the current slot is lower than the C/I of the F-CPICH in the previous slot, the MS generates a relative value symbol representing a C/I decrease in step 680. For example, the relative value symbol is set to '0'. The number of bits and contents of the relative value symbol is determined depending on the type of an encoder to which the relative value symbol is input, which will be described later.

A CQI symbol generated in one of steps 630, 670 or 680 is transmitted on the R-CQICH in step 640. That is, the CQI symbol is fed to the encoder 220 of FIG. 3 and transmitted to the BS in the afore-described procedure.

Figure 14:
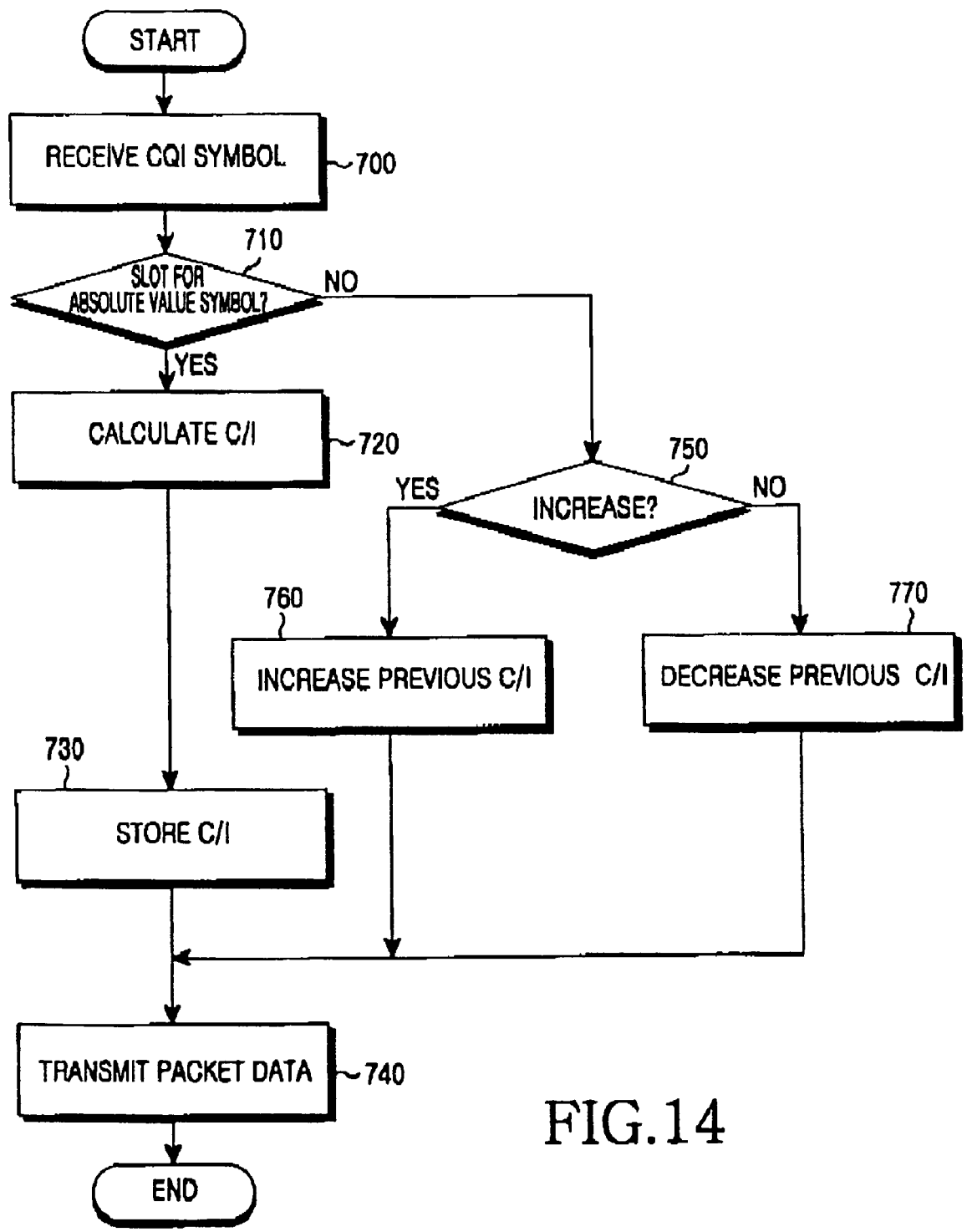
FIG. 14 is a flowchart illustrating another embodiment of the procedure for receiving forward channel quality information from the MS in the BS according to the present invention.

FIG. 14 is a flowchart illustrating another embodiment of the procedure for receiving forward channel quality information from the MS in the BS according to the present invention. The procedure occurs in each time slot by the CQI symbol calculator 350 of FIG. 5 in the BS.

Referring to FIG. 14, upon receipt of a CQI symbol in the current time slot in step 700, the BS determines whether the CQI symbol is an absolute value symbol or a relative value symbol in step 710. If the current slot in which the CQI symbol has been received is for an absolute value symbol, the CQI symbol is an absolute value symbol. If the current slot is for a relative value symbol, the CQI symbol is a relative value symbol. The determination is made in the same rule as applied to the MS. That is, if the result from calculating Eq. (1) according to the current system time is 0, the BS determines that an absolute value symbol has been received. If the result is not 0, the BS determines that a relative value symbol has been received. To make the determination, the BS stores Eq. (1) therein.

In the case of an absolute value symbol, the BS calculates the C/I of the F-CPICH referring to the mapping table in step 720 and stores the C/I for use in reception of a relative value symbol and packet data transmission in step 730.

In the case of a relative value symbol, the BS determines whether the relative value symbol represents a C/I increase or a C/I decrease in step 750. If the relative value symbol represents a C/I increase, the BS updates a previously stored C/I to increase by a predetermined unit in step 760. If the relative value symbol represents a C/I decrease, the BS updates the previously stored C/I to decrease by the predetermined unit in step 770. The predetermined unit can be 1 dB, for example.

After determining the C/I of the F-CPICH, the BS transmits packet data according to the C/I of the F-CPICH in step 740. That is, the BS schedules packet data transmission and determines transmission parameters based on the C/I of the F-CPICH.

For example, when an absolute value symbol '00101' is received in the previous slot and a relative value symbol representing a C/I increase is received in the current slot, the BS determines the C/I of the current slot to be −7.8 dB increased from −8.8 dB by 1 dB. When the absolute value symbol '00101' is received in the previous slot and a relative value symbol representing a C/I decrease is received in the current slot, the BS determines the C/I of the current slot to be −9.8 dB decreased from −8.8 dB by 1 dB.

According to the procedure illustrated in FIG. 14, the C/I of each slot is estimated by increasing or decreasing a C/I calculated using an absolute value symbol received from the MS by a predetermined unit until next absolute value symbol is received. In this case, the estimated C/I in the BS may be different from a C/I measured in the MS.

Figure 15:
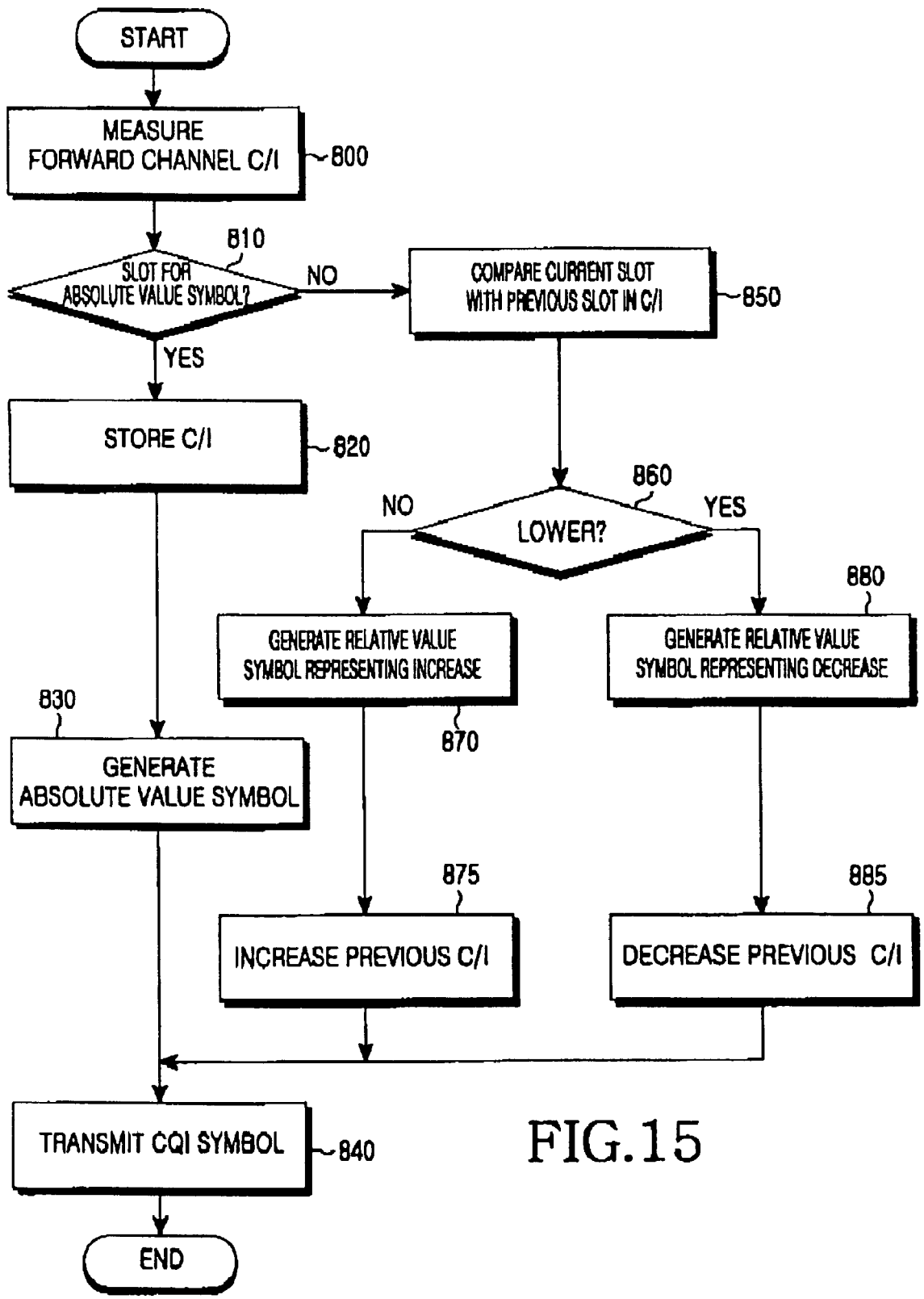
FIG. 15 is a flowchart illustrating a third embodiment of the procedure for transmitting forward channel quality information to the BS in the MS according to the present invention.

Accordingly, it is further contemplated as a third embodiment of the present invention illustrated in FIG. 15 that instead of the C/I measurement of the F-CPICH in the previous slot, its estimate is used for generating a relative value symbol in the MS. To do so, the MS estimates the C/I of the F-CPICH in each slot using the same algorithm as used in estimating a C/I in the BS, and stores the C/I estimate. The C/I estimate is compared with the C/I measurement of the F-CPICH in the next slot to thereby generate a relative value symbol.

FIG. 15 is a flowchart illustrating a third embodiment of the procedure for transmitting forward channel quality information to the BS in the MS according to the present invention.

Referring to FIG. 15, the MS measures the signal strength, that is, C/I of the F-CPICH in the current slot in step 800 and determines whether to transmit the C/I as an absolute value or a relative value by Eq. (1) in step 810. If the result of calculating Eq. (1) according to the current system time is 0, the MS determines to transmit the absolute value of the C/I and otherwise, it determines to transmit the relative value of the C/I.

If the current time slot is for an absolute value symbol, the MS stores the C/I measurement for use in generating a CQI symbol to be transmitted in the next slot in step 820. Then the MS generates an absolute value symbol representing the C/I referring to the mapping table in step 830.

If the current time slot is for a relative value symbol, the MS compares a previously stored C/I of the F-CPICH with the C/I of the F-CPICH in the current slot in step 850. If an absolute value symbol was transmitted in the previous slot, the previously stored C/I is indicated by the absolute value symbol. If a relative value symbol was transmitted in the previous slot, the previously stored C/I was updated according to the relative value symbol.

In step 860, the MS determine whether the C/I of the F-CPICH in the current slot is lower than the previously stored C/I. If the C/I of the F-CPICH in the current slot is higher than or equal to the previously stored C/I, the MS generates a relative value symbol indicating that the C/I of the current slot has been increased from the C/I estimate of the previous slot in step 870 and updates the previously stored C/I to be increased by a predetermined unit in step 875. If the C/I of the F-CPICH in the current slot is lower than the previously stored C/I, the MS generates a relative value symbol indicating that the C/I of the current slot has been decreased from the C/I estimate of the previous slot in step 880 and updates the previously stored C/I to be decreased by the predetermined unit in step 885. The decrement or increment unit is preset between the MS and the BS, for example, 1 dB. The number of bits and contents of the relative value symbol is determined depending on the type of an encoder to which the relative value symbol is input, which will be described later.

A CQI symbol generated in one of steps 830, 870 or 880 is transmitted on the R-CQICH in step 840. That is, the CQI symbol is fed to the encoder 220 of FIG. 3 and transmitted to the BS in the afore-described procedure.

Reception of the CQI symbol is performed in the same manner as illustrated in FIG. 14 and thus its detailed description is not provided here. It is to be noted that the MS and the BS use the same increment or decrement unit.

In accordance with the third embodiment of the present invention, the difference between the C/I measured in the MS and the C/I calculated in the BS can be minimized. If relative value symbols are transmitted in (n−1)th and nth slots, a relative value symbol in the nth slot represents the result from comparing a C/I measured in the nth slot with a C/I measured in the (n−1)th slot. If a C/I measured in the (n−1)th slot by the BS is different from a C/I measured in the (n−1)th slot by the MS, it follows that different C/Is are measured in the nth slot by the BS and the MS.

Herein below, the second embodiment illustrated in FIG. 13 will be described with the third embodiment illustrated in FIG. 15 with a specific example taken. It is assumed here that the C/Is of the F-CPICH in nth to (n+3)th slots measured in the MS are 1, 1.1, 1.2, and 1.3 dB, respectively, and an absolute value symbol is transmitted in the nth slot, followed by transmission of relative value symbols in the (n+1)th, (n+2)th, and (n+3)th slots.

In the second embodiment, after an absolute value symbol representing 1 dB is transmitted in the nth slot, relative value symbols representing a C/I increase are transmitted in the (n+1)th, (n+2)th, and (n+3)th slots. Then the BS estimates the C/Is of the F-CPICH in the (n+1)th, (n+2)th, and (n+3)th slots to be 2(=1+1), 3(=2+1), and 4(=3+1) dB, respectively, as illustrated in Table 1 below.

TABLE 1

|  | n | n + 1 | n + 2 | n + 3 |
|---|---|---|---|---|
| C/I measurement in MS | 1 dB | 1.1 dB | 1.2 dB | 1.3 dB |
| CQI symbol | 1 dB | Increase (+) | Increase (+) | Increase (+) |
| C/I estimate in BS | 1 dB | 2 dB | 3 dB | 4 dB |
| Difference | 0 dB | +0.9 dB | +1.8 dB | +2.7 dB |

As noted from Table 1, the C/I difference increases with passage of time. Thus a very high error of 2.7 dB occurs in the (n+3)th slot.

In the third embodiment, an absolute value symbol representing 1 dB is transmitted in the nth slot. Then the MS transmits to the BS a relative value symbol representing a C/I increase is transmitted in the (n+1)th slot and they estimate the C/I of the F-CPICH to be 2 dB. In the (n+2)th slot, the MS compares a C/I measurement 1.2 dB with the C/I estimate 2 dB and transmits a relative value symbol representing a C/I decrease. Then the MS and the BS estimate the C/I of the F-CPICH to be 1 dB. In the (n+3)th slot, the MS compares a C/I measurement 1.3 dB with the C/I estimate 1 dB and transmits to the BS a relative value symbol representing a C/I increase. The MS and the BS estimate the C/I of the F-CPICH to be 2 dB. Table 2 below lists C/I measurements, C/I estimates, and their differences.

TABLE 2

|  | n | n + 1 | n + 2 | n + 3 |
|---|---|---|---|---|
| C/I measurement in MS | 1 dB | 1.1 dB | 1.2 dB | 1.3 dB |
| CQI symbol | 1 dB | Increase (+) | Decrease (−) | Increase (+) |
| C/I estimate in BS | 1 dB | 2 dB | 1 dB | 2 dB |
| Difference | 0 dB | +0.9 dB | −0.2 dB | +0.7 dB |

As noted from Table 2, a relatively small error of 0.7 dB is produced in the (n+3)th slot.

Encoding CQI Symbol

An absolute value symbol represents the C/I of the F-CPICH measured in the MS in a plurality of levels, whereas a relative value symbol represents two or three C/I change states. This means that transmitting the relative value symbol reduces transmission information in the view of amount compared with transmitting the absolute value symbol. Utilizing this property, the block code characteristics of an encoder for encoding a relative value symbol can be improved.

A description will be made below of three embodiments of encoding a relative value symbol in such a way that block code performance is improved in transmitting the relative value symbol.

FIG. 16 illustrates a mapping table listing CQI symbols being encoder input mapped to code sequences being encoder output. It is assumed that an encoder has a code rate of 5/12 according to a known block coding scheme. As illustrated in FIG. 16, the encoder outputs a 12-bit code sequence for the input of a 5-bit CQI symbol (a4, a3, a2, a1, a0). While the following description is made in the context of an encoder having the input and output characteristic illustrated in FIG. 16, the present invention is also applicable to an encoder having a different code rate with some modification made.

In a first embodiment of encoding a relative value symbol, the relative value symbol has same bits as the absolute value symbol so that they can be encoded in the same encoder. In this case, encoder input symbols having a maximum difference between them after encoding are used as relative value symbols representing a C/I increase and a C/I decrease.

For the input of the relative value symbols, an encoder with a code rate of 5/12 outputs '000000000000' and '111111111111' depending on what they represent. Due to a large difference between the code sequences, the relative value symbols are readily discriminated at decoding. Referring to FIG. 16, to produce the code sequences, relative value symbols '00000' and '10000' are inputted to the encoder.

The relative value symbols '00000' indicates a C/I increase, that is, that the C/I of the F-CPICH in the current slot is higher than or equal to that in the previous slot, and '10000' indicates a C/I decrease, that is, that the relative value symbol '10000' indicates that the C/I of the F-CPICH in the current slot is lower than that in the previous slot, or vice versa. What the relative value symbols '00000' and '10000' represent is preset between the MS and the BS.

The relative value symbols input to the encoder with a code rate of 5/12 and their code sequences are listed in Table 3.

TABLE 3

| Relative value information | Input symbol (a4, a3, a2, a1, a0) | Code sequence |
|---|---|---|
| Increase ('0') | '00000' | '000000000000' |
| Decrease ('1') | '10000' | '111111111111' |

In Table 3, the denotations of input symbols corresponding to the relative value information can be changed by negotiations between the MS and the BS. The important thing is to transmit the code sequences '000000000000' and '111111111111' as relative value symbols.

In Table 3, the MSB a4 of the CQI symbol (a4, a3, a2, a1, a0) is not used for a different service in Table 3. However, if the MSB a4 is used for different service, relative value symbols input to the encoder with a code rate of 5/12 are determined depending on what they represent as follows.

TABLE 4

| Relative value information | Input symbol (a4, a3, a2, a1, a0) | Code sequence |
|---|---|---|
| Increase ('0')/ The different service ('0') | '00000' | '000000000000' |
| Decrease ('1')/ The different service ('0') | '00100' | '011100001111' |
| Increase ('0')/ The different service ('1') | '01000' | '000011111111' |
| Decrease ('1')/ The different service ('1') | '01100' | '011111110000' |

As seen from Table 4, in the case where the bit a4 is used for a different service, the 5 bits input symbol includes meanings of the relative value information and the different service. Use of '00000', '00100', '01000', and '01100' as input symbols optimizes decoding performance since there are large differences between their code sequences. As stated before, what the input symbols represent can be changed by negotiations between the MS and the BS and the important thing is to transmit the relative code symbols using the code sequences '000000000000', '011100001111', '000011111111', and '011111110000'.

Encoding an absolute value symbol and a relative value symbol using the encoder 220 with a code rate of 5/12 according to the present invention will be described below with reference to FIG. 3.

Referring to FIG. 3, the CQI symbol generator 210 receives the C/I of the F-CPICH measured in the current slot and determines whether to transmit a relative value symbol or an absolute value symbol in the current slot by Eq. (1). If the result of calculating Eq. (1) according to the current system time is 0, the MS determines to transmit an absolute value symbol and otherwise, it determines to transmit a relative value symbol.

According to the determination, the CQI symbol generator 210 generates an absolute value symbol representing the C/I of the current slot, or a relative value symbol indicating the result of comparing the C/I of the current slot with the C/I of the previous slot.

The relative value symbol represents a C/I increase or a C/I decrease. Alternatively, the relative value symbol represents a C/I increase, no change in C/I, or a C/I decrease. That is, two C/I states or three C/I states can be expressed with relative value symbols. In the case where the MSB a4 is used for a different service, the relative value symbols are constructed, considering what the MSB a4 indicates.

In the case where the current slot is assigned for transmitting an absolute value symbol, the CQI symbol generator 210 outputs a 5-bit absolute value symbol representing the C/I of the current slot to the encoder 220.

On the other hand, in the case where the current slot is assigned for transmitting a relative value symbol and the MSB a4 is not used for a different service, the CQI symbol generator 210 selects a corresponding CQI symbol from the 5-bit CQI symbols ('00000' and '10000') listed in Table 3. If the C/I of the current slot is higher than or equal to the C/I of the previous slot, the CQI symbol '00000' indicating a C/I increase is output. If the C/I of the current slot is lower than to the C/I of the previous slot, the CQI symbol '10000' indicating a C/I decrease is output.

In the case where the current slot is assigned for transmitting a relative value symbol and the MSB a4 is used for a different service, the CQI symbol generator 210 selects a corresponding CQI symbol from the 5-bit CQI symbols ('00000', '00100', '01000' and '01100') listed in Table 4. If the C/I of the current slot is higher than or equal to the C/I of the previous slot, the CQI symbol '00000' or '01000' indicating a C/I increase is output. If the C/I of the current slot is lower than to the C/I of the previous slot, the CQI symbol '00100' or '01100' indicating a C/I decrease is output.

The encoder 220 maps the CQI symbol received from the CQI symbol generator 210 to a corresponding binary code sequence according to a mapping rule illustrated in FIG. 16. The binary code sequence is fed to the Walsh cover 240 and transmitted to the BS after modulation.

The BS interprets the CQI symbol received from the MS on the R-CQICH. If the CQI symbol is a relative value symbol and its MSB a4 is not used for a different service, the BS interprets the relative value symbol referring to Table 3. On the other hand, if the CQI symbol is a relative value symbol and its MSB a4 is used for a different service, the BS interprets the relative value symbol referring to Table 4. The CQI symbol interpretation is carried out in the procedure illustrated in FIG. 12 or 14.

In a second embodiment of encoding a relative value symbol, two different encoders are used to encode an absolute value symbol and a relative value symbol that differ in the number of bits. In this case, an absolute value symbol is encoded in an encoder with a code rate of $5/12$ and a relative value symbol, in an encoder with a code rate of n/12 (n is not 5).

For example, the code rate of the encoder for the relative value symbol is $1/12$. For the input of a one-bit relative value symbol, the encoder outputs a 12-bit sequence '000000000000' or '111111111111'. The relationship between encoder input and code sequences after encoding at a code rate of $1/12$ is illustrated in Table 5.

TABLE 5

| Relative value information | Input symbol (a0) | Code sequence |
|---|---|---|
| Increase ('0') | '0' | '000000000000' |
| Decrease ('1') | '1' | '111111111111' |

When the MSB a4 is used for a different service, an encoder with a code rate of $2/12$ having input and output characteristics illustrated in Table. 4 are used to encode a relative value symbol.

Figure 17:
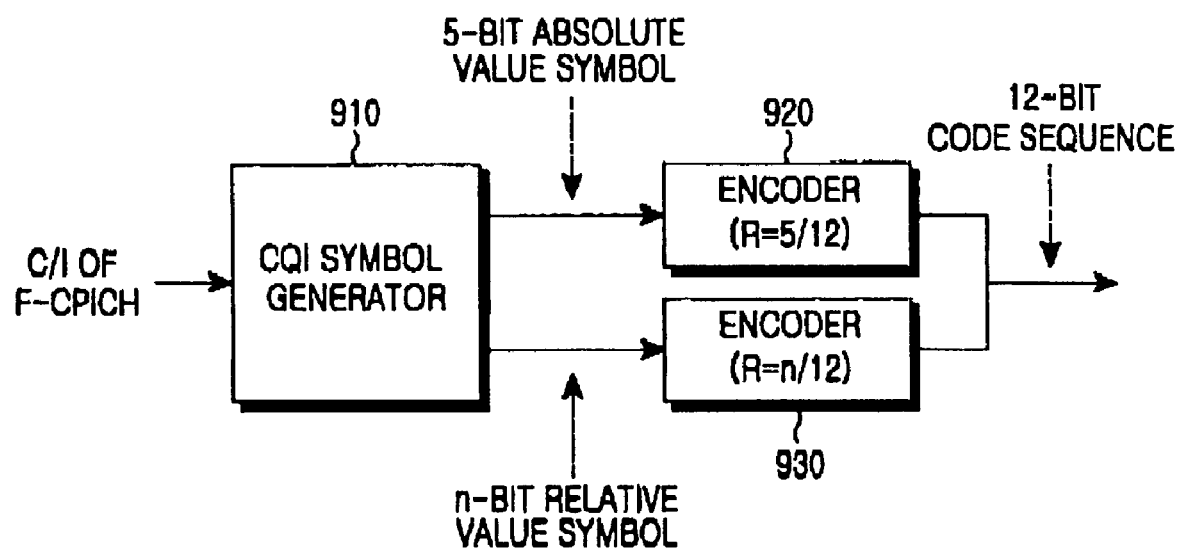
FIG. 17 is a block diagram of an encoding apparatus using different encoders for separately encoding an absolute value symbol and a relative value symbol according to the present invention.

FIG. 17 is a block diagram of an encoding apparatus using different encoders for separately encoding an absolute value symbol and a relative value symbol according to the present invention. The symbol generator 210 and the encoder 220 of FIG. 3 are illustrated in more detail in FIG. 17, except that two encoders 920 and 930 with different code rates are used to encode the absolute value symbol and the relative value symbol separately. In this regard, it is described herein below by way of an example that the encoder 920 has a code rate $5/12$, however, the code rate can be varied in accordance with the number of bits expressed by the absolute value symbol.

Referring to FIG. 17, a CQI symbol generator 910 receives the C/I of the F-CPICH in the current slot and determines whether to transmit an absolute value symbol or a relative value symbol in the current slot by Eq. (1). If the result of calculating Eq. (1) according to the current system time is 0, the MS determines to transmit the absolute value symbol of the C/I and otherwise, it determines to transmit the relative value symbol of the C/I.

According to the determination, the CQI symbol generator 910 generates an absolute value symbol representing the C/I of the current slot, or a relative value symbol representing the result of comparing the C/I of the current slot with the C/I of the previous slot.

The relative value symbol represents a C/I increase or a C/I decrease. Alternatively, the relative value symbol represents a C/I increase, no change in C/I, or a C/I decrease. That is, two C/I states or three C/I states can be expressed with relative value symbols each having n bits (n is not 5). In the case where the MSB a4 of CQI symbol is used for a different service, the relative value symbols are constructed, considering what the different service indicates.

In the case where the current slot is for an absolute value symbol, the CQI symbol generator 910 outputs a 5-bit absolute value symbol representing the C/I of the current slot to the first encoder 920 with a code rate of $5/12$.

In the case where the current slot is for a relative value symbol, the CQI symbol generator 910 outputs an n-bit (1-bit or 2-bit) relative value symbol to the second encoder 930 having a code rate of n/12. When the relative value symbol is 1 bit, the code rate of the second encoder 930 is $1/12$, and when the relative value symbol is 2 bits, the code rate is $2/12$.

If the MSB a4 of the relative value symbol is not used for a different service, the CQI symbol generator 910 outputs a corresponding 1-bit CQI symbol '0' or '1' illustrated in Table 5 to the second encoder 930 with a code rate of $1/12$. If the C/I of the current slot is higher than or equal to the C/I of the previous slot, the CQI symbol '0' representing a C/I increase is output. If the C/I of the current slot is lower than the C/I of the previous slot, the CQI symbol '1' representing a C/I decrease is output.

If the MSB a4 of the relative value symbol is used for a different service, the CQI symbol generator 910 outputs a corresponding 2-bit CQI symbol '00', '10', '01' or '11' illustrated in Table 4 to the second encoder 930 with a code rate of 2/12. If the C/I of the current slot is higher than or equal to the C/I of the previous slot, the CQI symbol '00' or '01' representing a C/I increase is output. If the C/I of the current slot is lower than the C/I of the previous slot, the CQI symbol '10' or '11' representing a C/I decrease is output.

The second encoder 930 maps the n-bit relative value symbol received from the CQI symbol generator 910 to a corresponding binary code sequence according to the mapping rule illustrated in FIG. 16. The first encoder 920 maps the absolute value symbol received from the CQI symbol generator 910 to a corresponding binary code sequence according to the mapping rule illustrated in FIG. 16. The binary code sequences are fed to the Walsh cover 240 and transmitted to the BS after modulation.

Although different encoders are used to encode the absolute value symbol and the relative value symbol, in the MS as illustrated in FIG. 17, the CQI symbols can be decoded in a single decoder in the BS. This is because the code sequences from the absolute value symbol and the relative value symbol have the same number of bits. Referring to FIG. 5, the decoder 340 receives a 12-bit code sequence and outputs a 5-bit CQI symbol. If the current slot is assigned for transmitting an absolute value symbol, the CQI symbol represents a C/I. If the current slot is assigned for transmitting a relative value symbol, the CQI symbol represents a C/I increase or decrease. Hence the CQI symbol calculator 350 interprets the CQI symbol according to whether the current slot is assigned for an absolute value symbol or a relative value symbol.

In the case where the received CQI symbol is a relative value symbol and the MSB a4 of the relative value symbol is not used for a different service, the CQI symbol calculator 350 interprets the relative value symbol referring to Table 5. On the other hand, in the case where the received CQI symbol is a relative value symbol and the MSB a4 of the relative value symbol is used, the CQI symbol calculator 350 interprets the relative value symbol referring to Table 4. The CQI symbol interpretation is carried out in the procedure illustrated in FIG. 12 or FIG. 14.

In a third embodiment of encoding a relative value symbol, a single encoder is used to encode an absolute value symbol and a relative value symbol, and a particular bit input to the encoder is set to an off state during transmission of the relative value symbol. In the off state, no signal is input to the encoder, so that encoder input does not influence generation of a code sequence. The relationship between input symbols and output code sequences in the encoder with a code rate of 5/12 is illustrated in Table 6.

TABLE 6

| Relative value information | Input CQI symbol (a4, a3, a2, a1, a0) | Code sequence |
| --- | --- | --- |
| Increase ('0') | '0', 'off', 'off', 'off', 'off' | '000000000000' |
| Decrease ('1') | '1', 'off', 'off', 'off', 'off' | '111111111111' |

Table 6 shows relative value symbols with the MSB a4 is not used for a different service, that is, the MSB a4 determines what the 5-bit relative value symbol represents.

In the case where the MSB a4 is used for a different service, the relationship between input symbols and output code sequences in the encoder with a code rate of 5/12 is illustrated in Table 7.

TABLE 7

| Relative value information | Input CQI symbol (a4, a3, a2, a1, a0) |
| --- | --- |
| Increase ('0')/ The different service ('0') | 'off', '0', '0', 'off', 'off' |
| Decrease ('1')/ The different service ('0') | 'off', '1', '0', 'off', 'off' |
| Increase ('0')/ The different service ('1') | 'off', '0', '1', 'off', 'off' |
| Decrease ('1')/ The different service ('1') | 'off', '1', '1', 'off', 'off' |

Referring to Table 7, the bit a3 of a 5-bit CQI symbol determines what the relative value symbol represents, and the bit a2 thereof indicates what the bit a4 represents. The use of CQI symbols listed in Table 6 and Table 7 optimize decoding performance because the code sequences produced by encoding the CQI symbols have maximum differences between them.

Mapping of CQIS symbols (a4, a3, a2, a1, a0) illustrated in Table 6 and Table 7 and what they represent are preset between the MS and the BS.

In accordance with the present invention, an absolute value symbol is delivered in at least one predetermined slot, and relative value symbols, in the other slots, for transmission of forward channel quality information. Therefore, reverse overhead and interference are reduced and as a result, reverse traffic capacity is increased. Furthermore, a relative value symbol occupying a less information amount than an absolute value symbol is encoded in such a way that decoding performance is optimized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method in a mobile station of reporting to a base station the channel quality of a forward channel, comprising the steps of:
    measuring the channel quality of the forward channel during each of a plurality of time slots;
    transmitting an absolute value symbol in each of first and second consecutive time slots, each absolute value symbol representing the channel quality of the forward channel during one time slot; and
    transmitting a relative value symbol in each of at least one time slot after the second time slot, the relative value symbol representing a change in the channel quality of the forward channel in the at least one time slot after the second time slot from the channel quality of the forward channel in a previous time slot.

2. The method of claim 1, wherein the channel quality represents a carrier to interference ratio.

3. The method of claim 1, wherein the at least one relative value symbol is transmitted at a transmission power level less than a transmission power level of the absolute value symbol.

4. The method of claim 1, wherein the relative value symbol has less number of bits than of the absolute value symbol.

5. The method of claim 1, wherein the change in the channel quality indicates an increase, no change, or a decrease in the channel quality.

6. The method of claim 1, wherein the change in the channel quality is indicated according to a mapping table set between the base station and the mobile station.

7. The method of claim 1, wherein the first time slot for transmitting the absolute value symbol is different for each mobile station.

8. The method of claim 1, wherein the absolute value symbol is transmitted in two successive time slots.

9. An apparatus for reporting to a base station the channel quality of a forward channel, comprising:
a measurement circuit for measuring the channel quality of the forward channel during each of a plurality of time slots;
a symbol generator for generating an absolute value symbol in each of first and second consecutive time slots, each absolute value symbol representing the channel quality of the forward channel during one time slot, and generating a relative value symbol in each of at least one time slot after the second time slot, the relative value symbol representing a change in the channel quality of the forward channel in the at least one time slot after the second time slot from the channel quality of the forward channel in a previous time slot; and
a transmitter for transmitting the absolute value and relative value symbols to the base station.

10. The apparatus of claim 9, wherein the channel quality represents a carrier to interference ratio.

11. The apparatus of claim 9, wherein the relative value symbol is transmitted at a transmission power level less than a transmission power level of the absolute value symbol.

12. The apparatus of claim 9, wherein the relative value symbol has less number of bits than the absolute value symbol.

13. The apparatus of claim 9, wherein the change in the channel quality indicates an increase, no change or a decrease in the channel quality.

14. The apparatus of claim 13, wherein the change in the channel quality is indicated according to a mapping table set between the base station and the mobile station.

15. The method of claim 9, wherein the first time slot for transmitting the absolute value symbol is different for each mobile station.

16. A method in a base station of receiving from a mobile station a channel quality of a forward channel, comprising the steps of:
receiving a symbol representing the channel quality of the forward channel;
determining if the symbol is an absolute value symbol or a relative value symbol; and
calculating the channel quality according to the received symbol, wherein an absolute value symbol is received in each of first and second consecutive time slots, each absolute value symbol representing the channel quality of the forward channel during one time slot, and a relative value symbol is received in each of at least one time slot after the second time slot, the relative value symbol representing a change in the channel quality of the forward channel in the at least one time slot after the second time slot from the channel quality of the forward channel in a previous time slot.

17. The method of claim 16, wherein the channel quality represents a carrier to interference ratio.

18. The method of claim 16, wherein the relative value symbol is transmitted by the mobile station at a transmission power level less than a transmission power level of the absolute value symbol.

19. The method of claim 16, wherein the relative value symbol has less number of bits than the absolute value symbol.

20. The method of claim 16, wherein the change in the channel quality indicates an increase, no change or a decrease in the channel quality.

21. The method of claim 20, wherein the change in the channel quality is indicated according to a mapping table set between the base station and the mobile station.

22. The method of claim 20, further comprising the steps of:
determining transmission parameters based on the calculated channel quality; and
transmitting data to the mobile station according to the transmission parameters.

23. The method of claim 22, wherein the transmission parameters including data rate information.

24. The method of claim 16, wherein the first time slot for transmitting the absolute value symbol is different for each mobile station.

25. An apparatus in a base station for receiving from a mobile station a channel quality of a forward channel, comprising:
a receiver for receiving a symbol representing the channel quality of the forward channel; and
a controller for determining if the symbol is an absolute value symbol or a relative value symbol, and calculating the channel quality according to the received symbol, wherein an absolute value symbol is received in each of first and second consecutive time slots, each absolute value symbol representing the channel quality of the forward channel during one time slot, and a relative value symbol is received in each of at least one time slot after the second time slot, the relative value symbol representing a change in the channel quality of the forward channel in the at least one time slot after the second time slot from the channel quality of the forward channel in a previous time slot.

26. The apparatus of claim 25, wherein the channel quality represents a carrier to interference ratio.

27. The apparatus of claim 25, wherein the relative value symbol is transmitted by the mobile station at a transmission power level less than a transmission power level of the absolute value symbol.

28. The method of claim 25, wherein the relative value symbol has less number of bits than the absolute value symbol.

29. The apparatus of claim 25, wherein the change in the channel quality indicates an increase, no change or a decrease in the channel quality.

30. The apparatus of claim 29, wherein the change in the channel quality is indicated according to a mapping table set between the base station and the mobile station.

31. The apparatus of claim 25, wherein the first time slot for transmitting the absolute value symbol is different for each mobile station.

32. The apparatus of claim 25, wherein the controller further determines transmission parameters based on the calculated channel quality.

33. The apparatus of claim 32, further comprising a transmitter for transmitting data to the mobile station according to the transmission parameters.

34. The apparatus of claim 32, wherein the transmission parameters including data rate information.

* * * * *